United States Patent
Allan et al.

(10) Patent No.: US 10,716,045 B2
(45) Date of Patent: Jul. 14, 2020

(54) LOSSLESS HANDOVER FOR MOBILITY WITH LOCATION IDENTIFIER SEPARATION PROTOCOL IN 3RD GENERATION PARTNERSHIP PROJECT NETWORKS

(71) Applicant: Telefonaktiebolaget LM Ericsson (publ), Stockholm (SE)

(72) Inventors: David Ian Allan, San Jose, CA (US); Joel Halpern, Lessburg, VA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/480,299

(22) PCT Filed: Jan. 24, 2017

(86) PCT No.: PCT/IB2017/050365
§ 371 (c)(1),
(2) Date: Jul. 23, 2019

(87) PCT Pub. No.: WO2018/138545
PCT Pub. Date: Aug. 2, 2018

(65) Prior Publication Data
US 2020/0045604 A1    Feb. 6, 2020

(51) Int. Cl.
*H04W 36/14* (2009.01)
*H04W 36/16* (2009.01)
(Continued)

(52) U.S. Cl.
CPC ..... *H04W 36/165* (2013.01); *H04W 36/0055* (2013.01); *H04W 36/14* (2013.01); *H04W 36/22* (2013.01); *H04W 36/32* (2013.01)

(58) Field of Classification Search
CPC ............. H04W 36/00; H04W 36/0022; H04W 36/0027; H04W 36/0033; H04W 36/0061
See application file for complete search history.

(56) References Cited

U.S. PATENT DOCUMENTS 8,503,416 B2 * 8/2013 Haddad ................. H04W 8/065
370/329
8,879,394 B2   11/2014 Allan et al.
(Continued)

FOREIGN PATENT DOCUMENTS

EP    2782372 A1    9/2014
EP    2858315 A1    4/2015
(Continued)

OTHER PUBLICATIONS

Duller, et al., "LISP Delegated Database Tree, draft-ietf-lisp-ddt-08," IETF Trust, Network Working Group, Internet-Draft, Sep. 8, 2016, 37 pages.
(Continued)

*Primary Examiner* — Jean A Gelin
(74) *Attorney, Agent, or Firm* — Sage Patent Group

(57) ABSTRACT

A method is implemented by a network device in a cellular communication network. The method to improve handover processing by a source evolved universal terrestrial radio access network (E-UTRAN) node B (eNodeB) where the source eNodeB forwards traffic destined for a user equipment (UE) that is transferring its connection to a target eNodeB to enable mobility within the cellular communication network without anchor points. The method including receiving a handover request from the UE identifying the target eNodeB, sending a handover message to the target eNodeB, determining the UE is unavailable to the source eNodeB, and redirecting traffic for the UE to the target eNodeB.

16 Claims, 27 Drawing Sheets

(51) Int. Cl.
*H04W 36/00* (2009.01)
*H04W 36/22* (2009.01)
*H04W 36/32* (2009.01)

(56) References Cited

U.S. PATENT DOCUMENTS

| | | | |
|---|---|---|---|
| 2001/0021175 A1 | 9/2001 | Haverinen | |
| 2004/0066745 A1 | 4/2004 | Joe | |
| 2004/0264374 A1 | 12/2004 | Yu et al. | |
| 2005/0007954 A1 | 1/2005 | Sreemanthula et al. | |
| 2005/0063307 A1 | 3/2005 | Samuels et al. | |
| 2006/0120288 A1 | 6/2006 | Vasseur et al. | |
| 2006/0155801 A1 | 7/2006 | Brabson | |
| 2009/0003214 A1 | 1/2009 | Vaswani et al. | |
| 2010/0118781 A1* | 5/2010 | Petrovic | H04L 1/1887 370/328 |
| 2010/0208742 A1 | 8/2010 | Kafle et al. | |
| 2011/0002301 A1* | 1/2011 | Chan | H04W 40/36 370/331 |
| 2012/0180122 A1 | 7/2012 | Yan et al. | |
| 2012/0202502 A1* | 8/2012 | Wu | H04W 8/12 455/436 |
| 2012/0320876 A1 | 12/2012 | Zhou et al. | |
| 2013/0215772 A1* | 8/2013 | Kaur | H04W 36/0072 370/252 |
| 2014/0112139 A1 | 4/2014 | Allan et al. | |
| 2014/0115135 A1 | 4/2014 | Allan et al. | |
| 2014/0189160 A1 | 7/2014 | Haddad et al. | |
| 2014/0226642 A1 | 8/2014 | Haddad et al. | |
| 2015/0156660 A1 | 6/2015 | Luo et al. | |
| 2016/0119159 A1 | 4/2016 | Zhao et al. | |
| 2016/0127889 A1* | 5/2016 | Cui | H04W 36/08 370/328 |
| 2016/0286441 A1* | 9/2016 | Kweon | H04W 36/0016 |
| 2018/0007604 A1* | 1/2018 | Pillay-Esnault | H04L 65/104 |
| 2018/0279397 A1 | 9/2018 | Faccin et al. | |

FOREIGN PATENT DOCUMENTS

| | | |
|---|---|---|
| WO | 2015120902 A1 | 8/2015 |
| WO | 2017180335 A1 | 10/2017 |
| WO | 2018006017 A1 | 1/2018 |
| WO | 2018138544 A1 | 8/2018 |
| WO | 2018162947 A1 | 9/2018 |
| WO | 2018183740 A1 | 10/2018 |
| WO | 2018207006 A1 | 11/2018 |

OTHER PUBLICATIONS

Atkinson, et al., "ICMP Locator Update message for ILNPv6; draft-irtf-rrg-ilnp-icmpv6-06.txt," IETF Internet Draft, Jul. 10, 2012, pp. 1-12.
Atkinson, et al., "ILNP Architectural Description; draft-irtf-rrg-ilnp-arch-06.txt," IETF Trust, Internet Draft, Jul. 10, 2012, pp. 1-53.
Atkinson, et al., "IPv6 Nonce Destination Option for ILNPv6; draft-irtf-rrg-ilnp-noncev6-06.txt," IETF Trust, Internet Draft, Jul. 10, 2012, pp. 1-14.
Atkinson, et al., "Optional Advanced Deployment Scenarios for ILNP; draft-irtf-nrg-ilnp-adv-00.txt," Internet Draft, IETF Trust, Jan. 12, 2012, pp. 1-25.
Bogineni, et al., "Optimized Mobile User Plane Solutions for 5G; draft-bogineni-dmm-optimized-mobile-user-plane-00.txt," Internet-Draft, Mar. 5, 2018, pp. 1-39.
Cabellos, et al., "An Architectural Introduction to the Locator/ID Separation Protocol (LISP); draft-ietf-lisp-introduction-13.txt," Internet Engineering Task Force, IETF Trust, Network Working Group, Internet-Draft, Apr. 2, 2015, pp. 1-27.
Cabellos, et al., "LISPmob: Mobile Networking through LISP," Dec. 14, 2011, retrieved from http://www.openoverlayrouter.org/lispmob/site/default/files/users/user1/documents/LISPmob_Whitepaper.pdf on May 9, 2017, 8 pages.
Farinacci, et al., "LISP for the Mobile Network; draft-farinacci-lisp-mobile-network-04.txt," Internet Engineering Task Force, IETF Trust, Network Working Group, Internet-Draft, Sep. 11, 2018, pp. 1-24.
Gohar, et al., "A Seamless Handover Scheme in LISP Networks," 2013 International Conference on ICT Convergence (ICTC), IEEE, Oct. 14, 2013, 4 pages.
Hu, et al., "ID/Locator Distributed Mapping Server; draft-hu-lisp-dht-00.txt," Internet Engineering Task Force, Internet-Draft, Oct. 18, 2009, pp. 1-11.
Kurebayashi, et al., "Evolving 5G Routing," Sep. 21, 2017, pp. 1-17.
Moreno, et al., "Signal-Free LISP Multicast; draft-ietf-lisp-signal-free-multicast-01," Internet Engineering Task Force, IETF Trust, Network Working Group, Internet-Draft, Apr. 21, 2016, pp. 1-19.
Mueller, et al., "Mobility Management for 5G Network Architectures using Identifier-Locator Addressing; draft-mueller-ila-mobility-01.txt," Internet Engineering Task Force, IETF, Oct. 3, 2016, pp. 1-21.
RFC 6329: Fedyk, et al., "IS-IS Extensions Supporting IEEE 802.1aq Shortest Path Bridging," Internet Engineering Task Force (IETF), Request for Comments: 6329, Apr. 2012, 38 pages.
RFC 6740: Atkinson, et al., "Identifier-Locator Network Protocol (ILNP) Architectural Description," IETF Trust, Internet Research Task Force, Request for Comments: 6740, Nov. 10, 2012, pp. 1-53.
RFC 6741: Atkinson, et al., "Identifier-Locator Network Protocol (ILNP) Engineering Considerations," Internet Engineering Task Force, IETF Trust, Internet Research Task Force (IRTF), Request for Comments: 6741, Nov. 2012, pp. 1-38.
RFC 6742: Atkinson, et al., "DNS Resource Records for the Identifier-Locator Network Protocol (ILNP)," Internet Engineering Task Force, IETF Trust, Internet Research Task Force (IRTF), Request for Comments: 6742, Nov. 2012, pp. 1-20.
RFC 6743: Atkinson, et al., "ICMP Locator Update Message for the Identifier-Locator Network Protocol for IPv6 (ILNPv6)," Internet Engineering Task Force, IETF Trust, Internet Research Task Force (IRTF), Request for Comments: 6743, Nov. 2012, pp. 1-12.
RFC 6744: Atkinson, et al., "IPv6 Nonce Destination Option for the Identifier-Locator Network Protocol for IPv6 (ILNPv6)," Internet Engineering Task Force, IETF Trust, Internet Research Task Force (IRTF), Request for Comments: 3744, Nov. 2012, pp. 1-14.
RFC 6748: Atkinson, et al., "Optional Advanced Deployment Scenarios for the Identifier-Locator Network Protocol (ILNP)," Internet Engineering Task Force, IETF Trust, Internet Research Task Force (IRTF), Request for Comments: 3748, Nov. 2012, pp. 1-37.
RFC 6831: Farinacci, et al., "The Locator/ID Separation Protocol (LISP) for Multicast Environments," Internet Engineering Task Force (IETF), Request for Comments: 6831, Jan. 2013, pp. 1-28.
Rui, T., "Network Access Control Mechanism Based on Locator/Identifier Split," International Conference on Networking, Architecture, and Storage (NAS 2009), IEEE, Jul. 9, 2009, pp. 171-174.
Wijnands, et al., "Multicast using Bit Index Explicit Replication; draft-ietf-bier-architecture-04," Internet Engineering Task Force (IETF), Internet-Draft, Jul. 18, 2016, pp. 1-36.
Wijnands et al., "Multicast using Bit Index Explicit Replication; draft-wijnands-bier-architecture-05," Internet Engineering Task Force, Internet-Draft, Mar. 6, 2015, pp. 1-30.

* cited by examiner

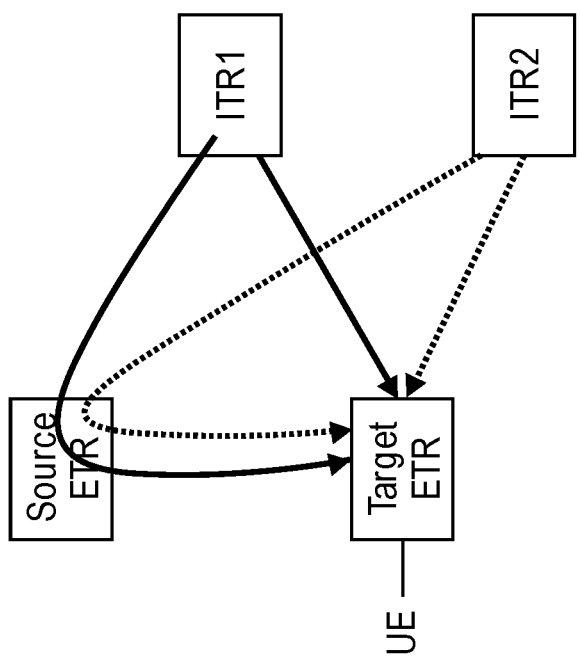

| Sequence observed at target ETR | Result |
|---|---|
| Start ITR1<br>Start ITR2<br>End ITR1<br>End ITR2 | Traffic from correspondent reached via ITR2 may be misordered if packet arrival interval in the flow is < the differential delay between the paths |
| Start ITR1<br>End ITR1<br>Start ITR2<br>End ITR2 | Traffic in the flow from ITR1 will experience unnecessary blocking in the time interval from start ITR2 to end ITR2 |
| Start ITR2<br>End ITR2<br>Start ITR2<br>End ITR1 | Traffic from ITR2 will experience unnecessary blocking until End ITR1 received as the End ITR2 negates the start ITR2 message |

FIG. 16

LOSSLESS HANDOVER FOR MOBILITY WITH LOCATION IDENTIFIER SEPARATION PROTOCOL IN 3RD GENERATION PARTNERSHIP PROJECT NETWORKS

CROSS-REFERENCE TO RELATED APPLICATIONS

This application is a national stage of International Application No. PCT/IB2017/050365, filed Jan. 24, 2017, which is hereby incorporated by reference.

TECHNICAL FIELD

Embodiments of the invention relate to the field of $3^{rd}$ Generation Partnership Project (3GPP) mobility; and more specifically, to a method and system for using location identifier separation protocol (LISP) to enable a distributed gateway architecture to improve efficiency in a 3GPP network by eliminating inefficiency related to the use of anchor points and further methods for efficiently managing loss handover of user equipment between attachment points.

BACKGROUND

Cellular communication networks enable user equipment (UE) 101, such as cellular phones and similar computing devices, to communicate using spread spectrum radio frequency communication. As shown in FIG. 1, the UE 101 communicates directly with a radio access network (RAN). The RAN includes a set of base stations such as evolved universal terrestrial radio access network (E-UTRAN) nodes, referred to as E-UTRAN node B or eNodeB 103. FIG. 1 is a diagram of an example architecture for a cellular communication system consistent with 3GPP standardized cellular communication architecture including an example UE 101 communicating with a eNodeB 103 of the network. The eNodeB 103 interfaces with a packet core network or evolved packet core (EPC) 115 that connects the UE to other devices in the cellular communication network and with devices external to the cellular communication network.

The EPC 115 and its components are responsible for enabling communication between the UE 101 and other devices both internal and external to the cellular communication system. The EPC 115 includes a serving gateway (S-GW) 105, a packet gateway (P-GW) 107, a mobility management entity (MME) 109 and similar components. Additional components are part of the EPC 115 (e.g., a home subscriber service (HSS)), but the components with less relevance to the handling of the UE 101 and its mobility have been excluded for clarity and to simplify the representation. The UE 101 may change the eNodeB 103 through which it communicates with the network as it moves about geographically. The MME 109, S-GW 105 and P-GW 107 coordinate to facilitate this mobility of the UE 101 without interruption to any ongoing telecommunication session of the UE 101.

The MME 109 is a control node that, among other duties, is responsible for determining a S-GW 105 that the UE 101 is to communicate with at attach time and when handovers between eNodeBs 103 in the RAN occur. The MME 109 has other responsibilities including idle mode communication with the UE 101, which includes paging and text retransmissions.

The S-GW 105 and the P-GW 107 provide anchor points for a UE 101 enabling various types of transitions that facilitate the mobility of the UE 101 without the UE losing connections with other devices. The S-GW 105 routes and forwards data to and from the UE 101 while functioning as a mobility anchor point for the UE 101 handovers between eNodeBs 103 and between long term evolution (LTE) and other 3GPP technology. The P-GW 107 provides connectivity between the UE 101 and external data packet networks by being a fixed anchor point that offers the UE's Internet Protocol (IP) address into a routable packet network. The S-GW and P-GW may belong to a common operator, or different operators depending on whether the UE is currently being served by a home or visited network.

As shown in the example simplified network of FIG. 1, a UE 101 communicates with the EPC 115 via the eNodeB 103 and reaches a correspondent 113, or 121 via P-GW 107. In this example, the traffic from the UE 101 would traverse the connected eNodeB 103, the S-GW 105, and P-GW 107, to reach a correspondent 113. If the correspondent is a mobile device, the path to that correspondent may also traverse a P-GW, S-GW and eNodeB which are also subtended to the common packet data network. The correspondents 113, 121 can be any device capable of receiving the traffic from the UE 101 and sending traffic to the UE 101 including cellular phones, computing devices and similar devices that may be connected through any number of intermediate networking or computing devices.

SUMMARY

In one embodiment, a method is implemented by a network device in a cellular communication network. The method is to improve handover processing by a source evolved universal terrestrial radio access network (E-UTRAN) node B (eNodeB) where the source eNodeB forwards traffic destined for a user equipment (UE) that is transferring its connection to a target eNodeB to enable mobility within the cellular communication network without anchor points. The method includes receiving a handover request from the UE identifying the target eNodeB, sending a handover message to the target eNodeB, determining the UE is unavailable to the source eNodeB, and redirecting traffic for the UE to the target eNodeB.

In another embodiment, a method is implemented by a network device in the cellular communication network. The method improves handover processing by a target eNodeB where the target eNodeB relays traffic between a UE and other devices connected to the cellular communication network to enable mobility within the cellular communication network without anchor points, the method including receiving a handover message from a source eNodeB identifying the UE, receiving and buffering redirected traffic for the UE from the source eNodeB, detecting connection of the UE, and sending the buffered traffic to the UE.

In a further embodiment, a network device in a cellular communication network executes a method to improve handover processing by a source eNodeB where the source eNodeB forwards traffic destined for a UE that is transferring its connection to a target eNodeB to enable mobility within the cellular communication network without anchor points. The network device includes a non-transitory computer-readable storage medium having stored therein a handover manager, and a processor coupled to the non-transitory computer-readable storage medium, the processor to execute the handover manager, the handover manager to receive a handover request from the UE identifying the target eNodeB, to send a handover message to the target eNodeB, to determine the UE is unavailable to the source eNodeB, and to redirect traffic for the UE to the target eNodeB.

In one embodiment, a network device in the cellular communication network executes a method to improve handover processing by a target eNodeB where the target eNodeB relays traffic between a UE and other devices connected to the cellular communication network to enable mobility within the cellular communication network without anchor points. The network device including a non-transitory computer-readable medium (2048) having stored therein a handover manager, and a processor coupled to the non-transitory computer readable medium, the processor to execute the handover manager, the handover manager to receive a handover message from a source eNodeB identifying the UE, to receive and buffer redirected traffic for the UE from the source eNodeB, to detect connection of the UE and to send the buffered traffic to the UE.

BRIEF DESCRIPTION OF THE DRAWINGS

The invention may best be understood by referring to the following description and accompanying drawings that are used to illustrate embodiments of the invention. In the drawings:

FIG. 16 is a diagram of one embodiment of the handling of a filter collision during a handover process.

DETAILED DESCRIPTION

Figure 1:
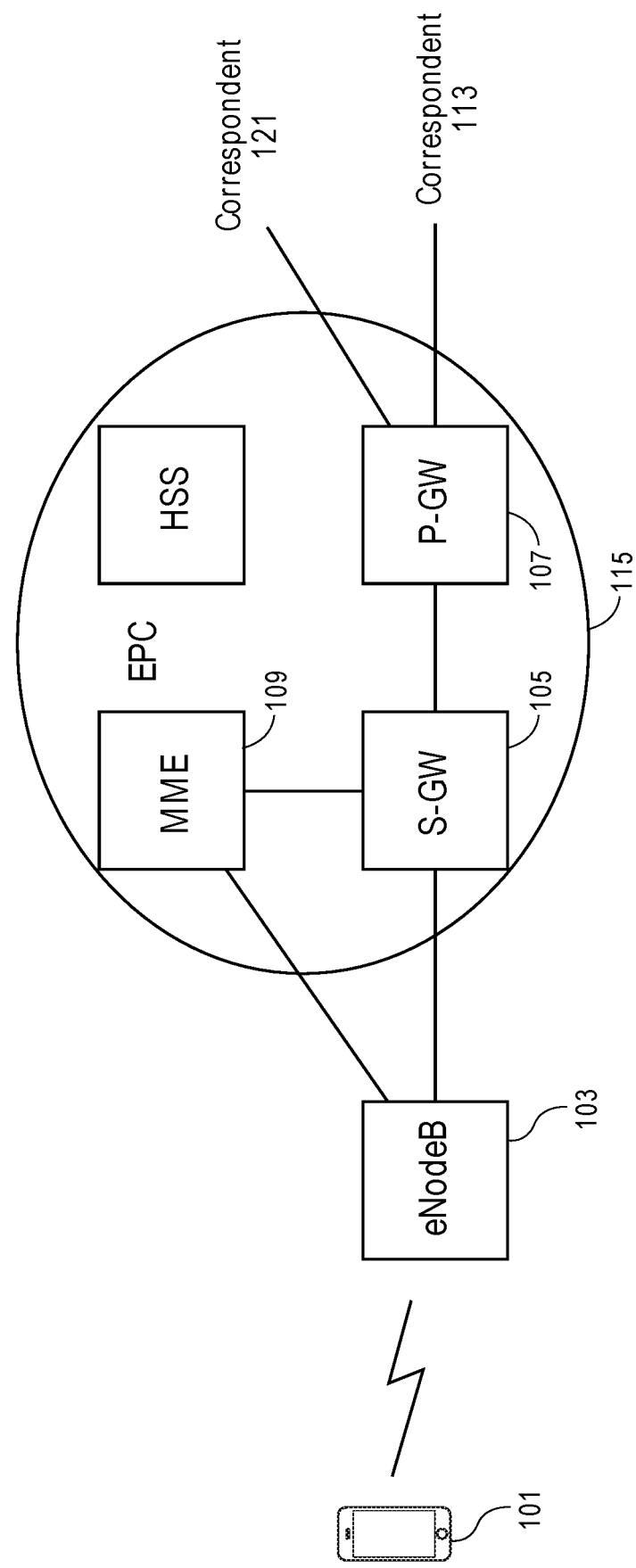
FIG. 1 is a diagram of one embodiment of a 3GPP network architecture.

The following description sets forth methods and system for improving the efficiency of bandwidth utilization in $3^{rd}$ Generation Partnership Project (3GPP) architecture networks. More specifically, the embodiments provide a method and system for using location identifier separation protocol (LISP) to enable a distributed gateway architecture to improve efficiency in a 3GPP network by eliminating inefficiency related to the use of anchor points. The 3GPP architecture and the geographic placement of its components is driven by both technical and business considerations and requires specific functionalities and functional distributions to be carried forward in any update to the architecture. The embodiments provide improved efficiency while preserving the key functionalities of the 3GPP architecture. The embodiments further build on this architecture to improve the efficiency and reliability of the handover process when a user equipment (UE) transitions from one attachment point in the network to another attachment point. These handover processes include using markers to identify and track traffic from remote tunnel routers, the use of filters for managing traffic forwarding and similar processes.

The specific inefficiencies in the 3GPP architecture that are addressed include the functions of the serving gateway (S-GW) and the packet gateway (P-GW) when serving as anchor points. A mobile carrier will typically deploy a very small number of P-GW sites nationally, hence these gateways are often located at a significant distance from a radio access network (RAN) and its constituent components such as the evolved universal terrestrial radio access network (E-UTRAN) nodes, referred to as E-UTRAN node B or eNodeB. Yet, traffic from a user equipment (UE) must traverse the S-GW and/or P-GW before reaching a correspondent device, which if it is another mobile terminal may only be reached by the P-GW and the S-GW serving the correspondent. The traffic to the S-GW and P-GW is tunneled to these devices and due to their distant location, bandwidth usage inefficiency is introduced into the communication system. The embodiments address this problem by introducing distributed user or data plane functions for the S-GW and/or the P-GW that enable these functions to be located at or near the eNodeB that enable much of the traffic to avoid being tunneled to the distant S-GW or P-GW. The embodiments also utilize identifiers/locator separation and mapping system technology to enable the separation and distribution. Centralized control functions associated with the distributed GW's facilitate interworking with the existing 3GPP deployments while hiding the distributed nature of the GW data plane implementation.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

LISP is routing technology that provides alternate semantics for Internet Protocol (IP) addressing. This is achieved via the tunneling of identity information, i.e., endpoint identifier (EID), between tunnel routers identified by routing locators (RLOCs). The on-the-wire format is a variation of IP in IP tunneling with simply different semantics associated with the IP addresses located at different points in the stack. Each of these values, the EID and RLOC, have separate address or numbering spaces. Splitting EID and RLOC enables a device to change locations within a LISP network without the identity of the device changing and therefore associated session state (e.g. transmission control protocol (TCP) or IP security (IPSEC)) remains valid independent of the EID's actual point of attachment to LISP network.

The embodiments utilize LISP to avoid the limitations of anchor points in the 3GPP architecture. The S-GW and P-GW in the 3GPP architecture are anchor points that also implement specific functionalities not easily dispensed with as they address business and regulatory requirements. The embodiments split the data or user plane functions of each gateway from the control plane functions by recognizing that the data plane functions can be distributed without changing key aspects of the 3GPP architecture if the control plane functions remained in the centralized or invariant location. As used herein, the terms "data plane functions" and "user plane functions" are interchangeable. These functions of the serving gateway and packet gateway are referred to herein as S-GWu and P-GWu functions, respectively, while the control plane functions are referred to as the S-GWc and P-GWc functions. An S-GW may therefore be implemented as an S-GWc function that controls a constellation of distributed S-GWu's.

With this distribution of the data plane functions, LISP can be utilized to mask the mobility of the data plane gateway functions associated with an individual UE's packet data network (PDN) session/connections from other components of the 3GPP architecture and from the correspondent. Thus, the embodiments provide a distribution of the data plane functions in the form of the S-GWu and P-GWu. The processes in particular set forth herein relate to the operation of tunnel routers (TRs), which implement the LISP forwarding that enable the masking of the UE and correspondent locations and facilitating mobility where distributed S-GWu's and/or P-GWu's are utilized.

Figure 2:
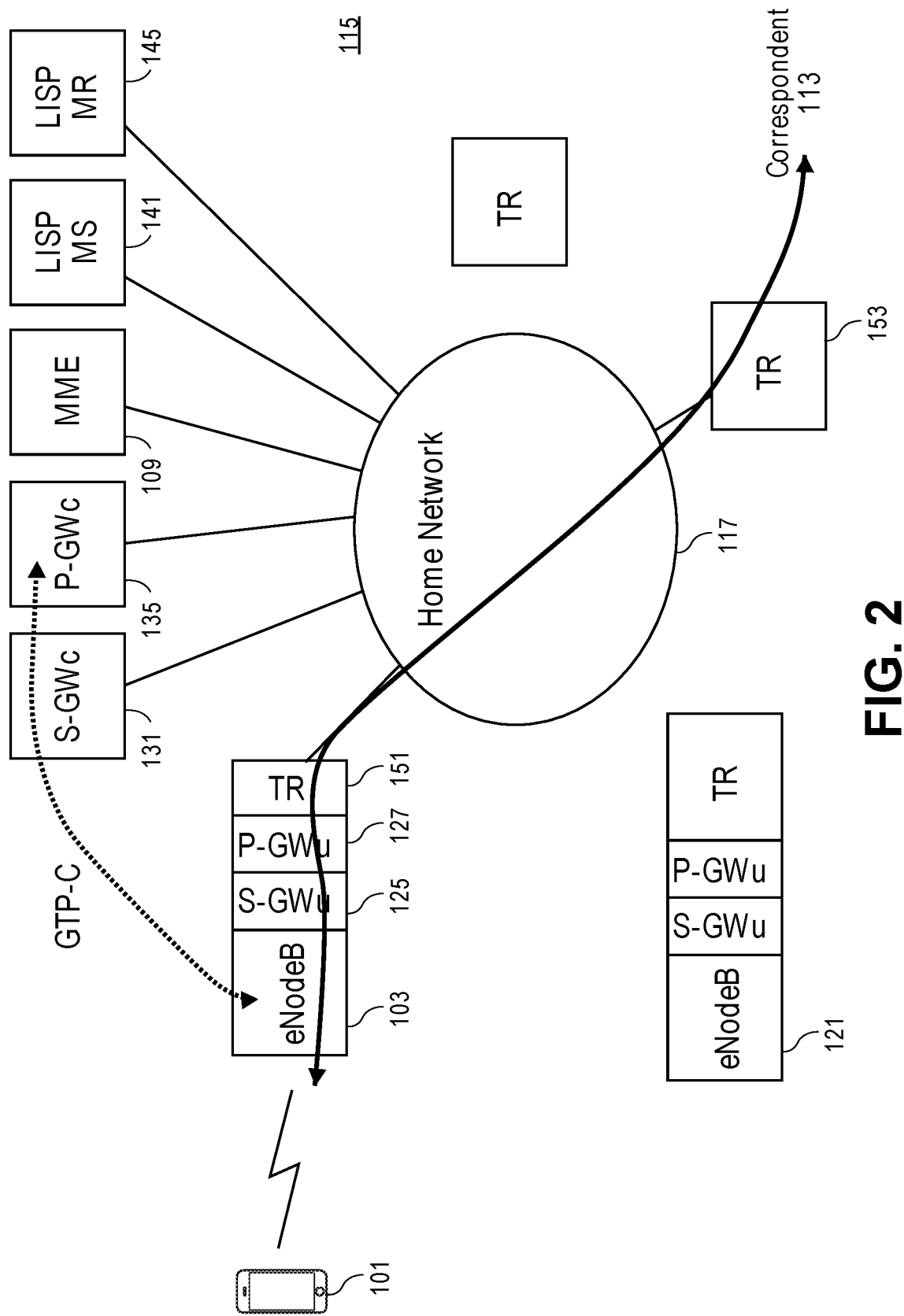
FIG. 2 is a diagram of one embodiment of an enhanced 3GPP network architecture with distributed S-GWs and P-GWs.

FIG. 2 is a diagram of one embodiment of a 3GPP network architecture with distributed S-GWs and P-GWs. In this example illustrated embodiment, the S-GWu 125 and P-GWu 127 are co-located with an eNodeB 103, such that a UE 101 being served by a home network 117 can connect to the network via the S-GWu 125 and P-GWu 127 functions at or near the eNodeB 103. This is facilitated by TRs 151, 153 that forward the data traffic between a UE 101 and correspondent 113 using LISP. This remains true where the UE 101 may move to connect to another eNodeB 121. The UE 101 could move from a source eNodeB 103 to a target eNodeB 121 without interruption to the communication session with the correspondent 113. The state of the S-GWu and/or P-GWu can be transferred or synchronized between the GW instances at the source eNodeB 103 and those at the target eNodeB 121. Any method or process for coordinating the transfer of state and related configuration data from the source eNodeB 103 to the target eNodeB 121 can be utilized.

In this example, functions of both the S-GW and the P-GW are distributed. However, one skilled in the art would understand that this configuration is provided by way of example and not limitation. The distribution of the functions of the S-GW and P-GW in combination with the use of LISP can be utilized in other configurations where different permutations of the functions are distributed. The key scenarios of interest being both the P-GW and S-GW user plane components being distributed (home network scenario), and the S-GW user plane is distributed, and the P-GW is remote (a typical visited network scenario). Further examples illustrating some of the variations are described herein below with reference to FIGS. 3-5.

Returning to the discussion of FIG. 2, the control plane functions of the S-GW and P-GW, referred to as S-GWc 131 and P-GWc 135, respectively, remain in the EPC 115. Similarly, the MME 109 remains in the EPC 115 and continues to perform the same functions. The EPC 115 has been augmented with a LISP map server (MS) 141 and a LISP map resolver (MR) 145. The LISP MS 141 manages a database of EID and RLOC mappings that are determined from communication with TRs 151, 153. The LISP MS 141 receives EID information about connected devices from TRs 151, 153 that are stored in the database and associated with the respective TRs 151, 153. Similarly, the LISP MR 145 handles map requests from the TRs 151, 153 when serving as ingress TRs and uses the database to find an appropriate egress TR to reach a destination EID. Thus, these components enable the distributed mobility of the S-GWu 125 and P-GWu 127 along with the use of TRs 151, 153.

The distributed S-GWu and/or P-GWu can be instantiated at each eNodeB with a logically separate instance for each connected UE 101. Thus, the state and similar configuration are specific to the UE 101 and can be transferred or shared with other instances at other eNodeBs to facilitate handover operations. All S-GWu and/or P-GWu instances are controlled by S-GWc and P-GWc instances. Each such control instance may control one or several corresponding data plane instances. This enables the controllers to coordinate amongst the data plane instances while preserving the external appearance and interfaces of a single monolithic gateway.

Figure 3:
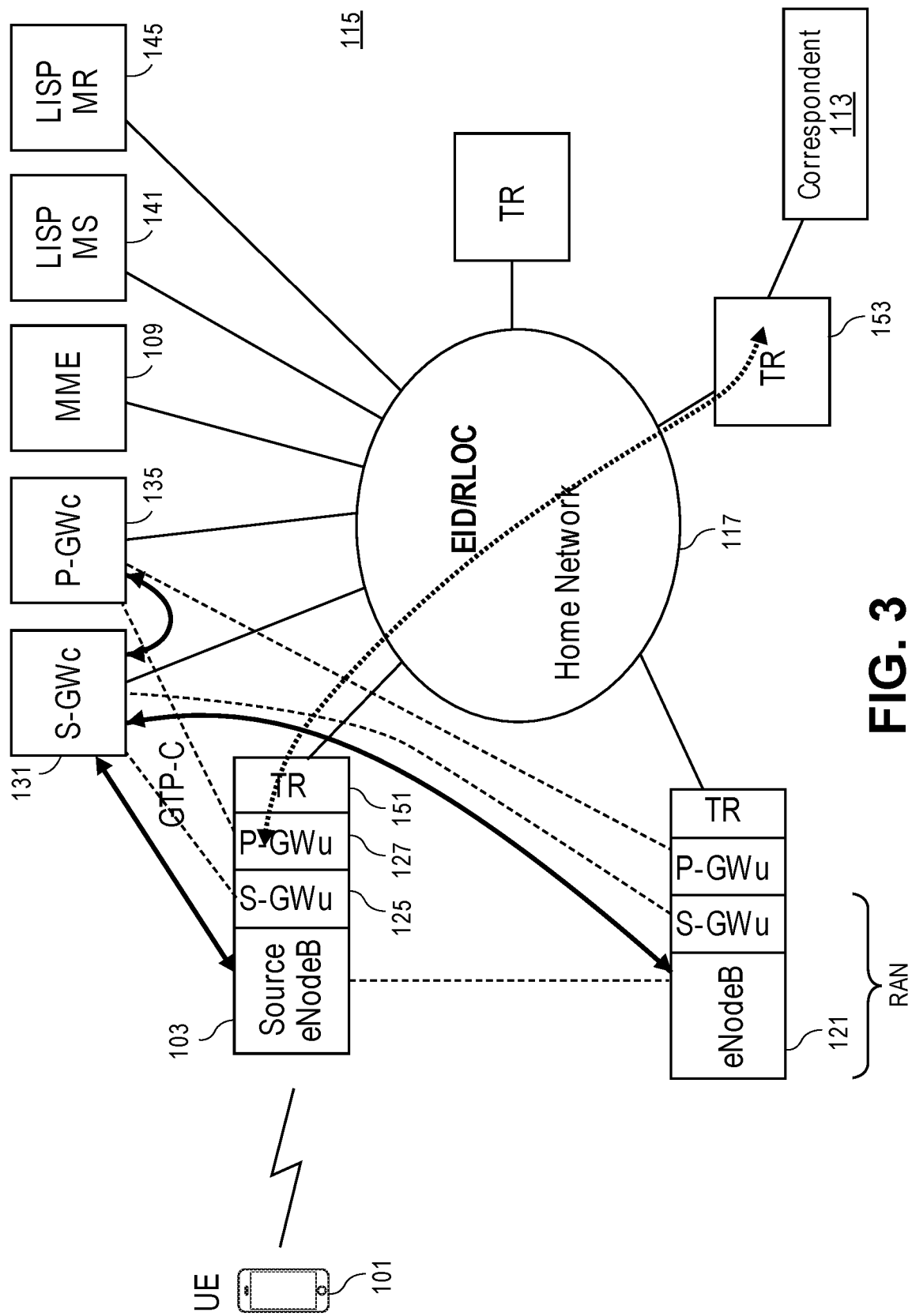
FIG. 3 is a diagram of one embodiment of an enhanced 3GPP network architecture with data traffic flows when a UE is connected to a home network.

FIG. 3 is a diagram of one embodiment of a 3GPP network architecture with data traffic flows when a UE is connected to a home network. General packet radio service (GPRS) tunneling protocol (GTP) is utilized to carry data and control information from an eNodeB to the EPC. GTP-C is utilized to manage tunnels and control plane traffic between the MME, the S-GW and P-GW whereas GTP-U is normally utilized to convey data/user plane traffic from an eNodeB to a S-GW and ultimately to a P-GW. In the illustrated embodiment, the eNodeB, S-GWu and P-GWu have been collapsed into a single node, hence there is no actual GTP-U component.

A UE 101 served by a home network 117 is shown. The UE 101 is connected to a source eNodeB 103 that may have co-located S-GWu 125 and P-GWu 127 as well as a TR 151. GTP-C (solid line) is utilized to communicate control plane information between the source eNodeB and the S-GWc and other EPC components (not illustrated) as well as between the S-GWc and the P-GWc. LISP routing (dotted line) is used to send the data plane traffic across the EPC from an ingress TR 151 to an egress TR 153 to enable communication between the UE 101 and the correspondent 113. In the event of a handover from a source eNodeB 103 to a target eNodeB 121, GTP-C may be utilized to coordinate the transfer or synchronization of state from the source eNodeB 103, S-GWu 125 and P-GWu 127 to the target eNodeB 121, and associated S-GWu and P-GWu.

In the example, the TR co-located with the P-GWu determines the RLOC serving the correspondent, which may be the egress TR. The RLOC may be determined using the destination EID from the data traffic by contacting the LISP MR. After a transfer of the UE 101 to a target eNodeB 121, the local instance of the P-GWu will similarly use the destination EID to forward the traffic via the local TR to the egress TR 153 without interruption.

Figure 4:
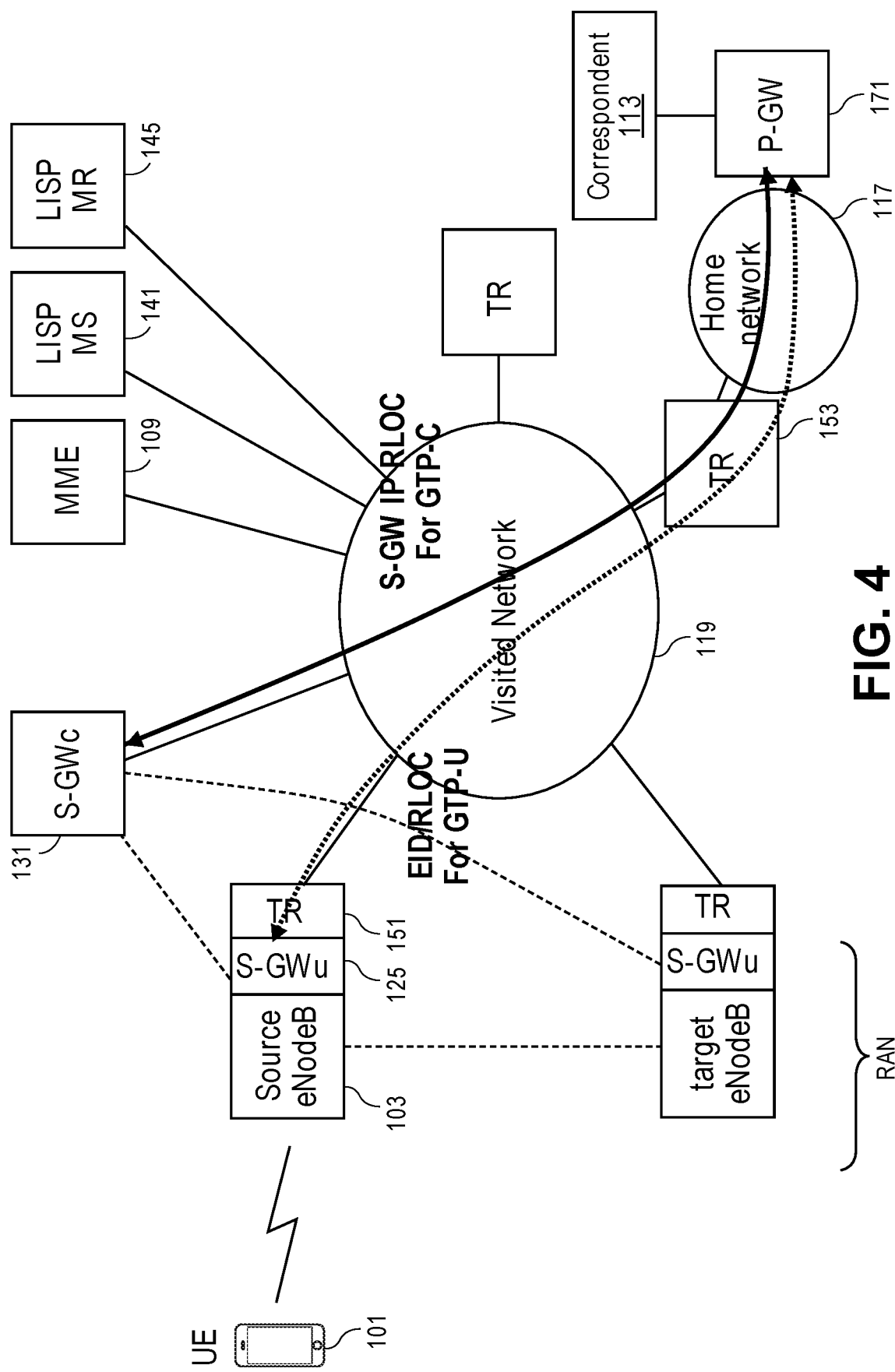
FIG. 4 is a diagram of one embodiment of an enhanced 3GPP network architecture with data traffic flows when a UE is connected to a visited network.

FIG. 4 is a diagram of one embodiment of a 3GPP network architecture with data traffic flows when a UE is connected to a visited network 119. In this example scenario, the S-GWc 131 communicates control GTP messages to a P-GW 171 in a home network 117. The S-GWu and ingress TR 151 communicate with the egress TR 153 across the visited network 119 to reach the home network 117 and correspondent 113. The home network P-GW 171 may be implemented as a monolithic entity or may be distributed in the fashion of the visited network. The ingress TR 151 resolves the EID of the remote P-GW 171 via the LISP mapping system in order to determine the RLOC of the egress TR 153. In this scenario, a local P-GWu is not needed and/or utilized at the attached eNodeB 103 for the particular PDN session.

Figure 5:
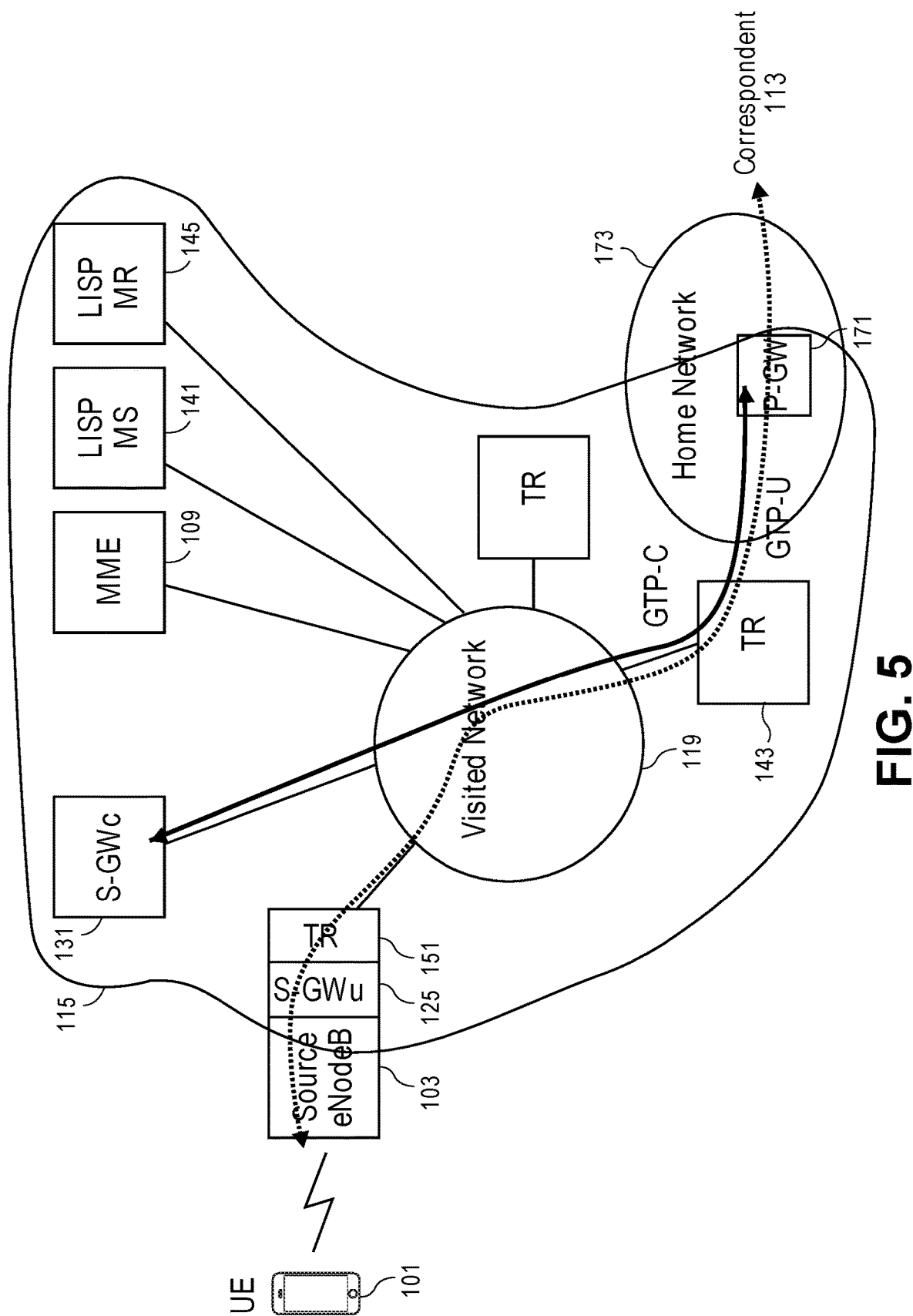
FIG. 5 is a diagram of another embodiment of an enhanced 3GPP network architecture with data traffic flows when a UE is connected to a visited network.

FIG. 5 is a diagram of another embodiment of a 3GPP network architecture with data traffic flows when a UE 101 is connected to a visited network. In this embodiment LISP is not used for the visited network scenario, such that the overhead of both GTP and LISP tunneling is not incurred. Thus, as illustrated, GTP-U is used between the UE 101 and the correspondent 113, and the S-GWc 131 of the visited network communicates with the P-GW 171 of the home network 173 via GTP-C. The TRs 151 and 143 do not LISP encapsulate this traffic in this case.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Figure 6A:
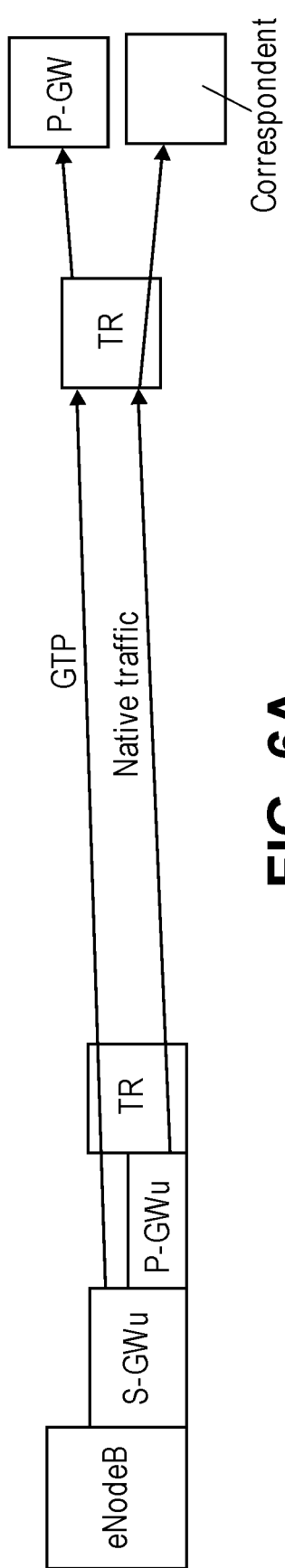
FIG. 6A is a diagram of one embodiment of traffic flow where a tunnel router (TR) is an egress for outbound traffic.

FIG. 6A is a diagram of one embodiment of traffic flow where a tunnel router (TR) is an egress for outbound traffic. GTP-U traffic is examined for its destination by the S-GWu to determine an EID/RLOC for a destination and passed to the ingress TR to be forwarded to the associated egress TR. Similarly, native traffic, e.g., IP traffic, may be forwarded by use of an associated EID/RLOC for a destination address by the P-GWu via the ingress TR and egress TR. GTP traffic is routed to a remote P-GW where the destination is not in the home network, whereas native traffic is routed to the correspondent in the home network.

Figure 6B:
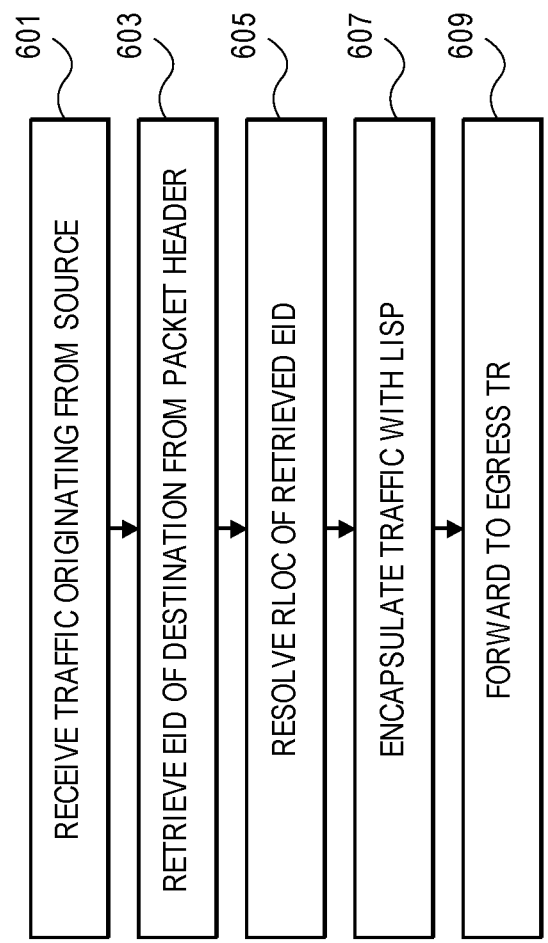
FIG. 6B is a flowchart of one embodiment of a process of the TR to facilitate communication between a UE and a correspondent.

FIG. 6B is a flowchart of one embodiment of a process of the TR to facilitate communication between a UE and a correspondent. The process is implemented by the ingress/local TR at the eNodeB that is coupled to the UE. There are two scenarios affecting the processing of traffic from the UE. In the first scenario, the S-GW is distributed and split into the S-GWu and S-GWc, while the P-GW is not split. In the second scenario, both the S-GW and the P-GW are split and distributed.

The process of the TR begins in response to the receiving of traffic originating at the UE or similar source (Block 601). The traffic may have passed through the S-GWu and/or P-GWu. The TR examines the packet header, which may be either an encapsulating GTP header or a native header (e.g., an IP header) and from that determines the destination EID for the packet (Block 603). The TR determines an RLOC by querying the LISP MR or similar service to determine the egress TR for the destination (Block 605).

The received packet is then encapsulated in a LISP packet where the LISP header is added to the received packet and the encapsulated packet is forwarded in an IP packet addressed to the destination RLOC (Block 607). The encapsulated packet can then be forwarded over the core network that implements LISP, or a similar LISP network toward the destination (Block 609). The destination is reached via the egress TR and may be a correspondent or a P-GW where the destination is outside the attached network.

In an alternate embodiment, the same two scenarios affect the forwarding of the received data traffic by the ingress TR. In the first scenario, the S-GW is distributed, but the P-GW is not distributed. In the second scenario, the S-GW and the P-GW are distributed. In the first scenario, the S-GWu sends GTP encapsulated traffic to the remote P-GWs bypassing the ingress TR. In the second scenario, the ingress TR receives native IP traffic from the distributed S-GW/P-GW and resolved the destination IP address of the traffic to an RLOC for forwarding via LISP by encapsulating the packet with the LISP header and forwarding the packets with an IP packet addressed to the destination RLOC.

Figure 7A:
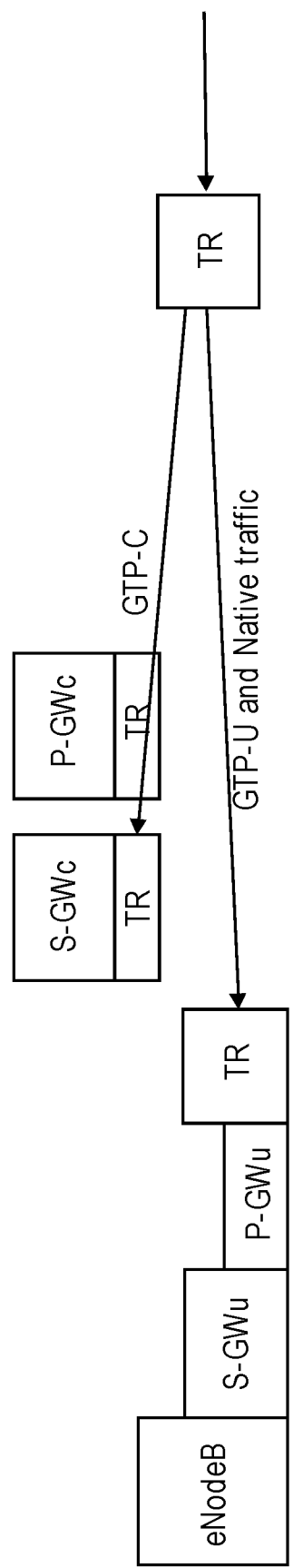
FIG. 7A is a diagram of one embodiment of traffic flow where a TR is an ingress for incoming traffic.

FIG. 7A is a diagram of one embodiment of traffic flow where a TR is an ingress for incoming traffic. In this case the ingress TR is sending traffic toward the UE from a correspondent or similar source. The traffic received by the ingress TR may be identified as either data traffic or control traffic. Non GTP traffic has an outer header with a destination EID in the destination address that is mapped to an RLOC. This traffic is encapsulated by the ingress TR to be forwarded via LISP. GTP-C traffic is delivered as is, subject to normal internet service provider (ISP) filtering policies, without any use of LISP. GTP-U traffic received at the TR has an EID located in an inner header that is resolved to determine the correct RLOC.

Figure 7B:
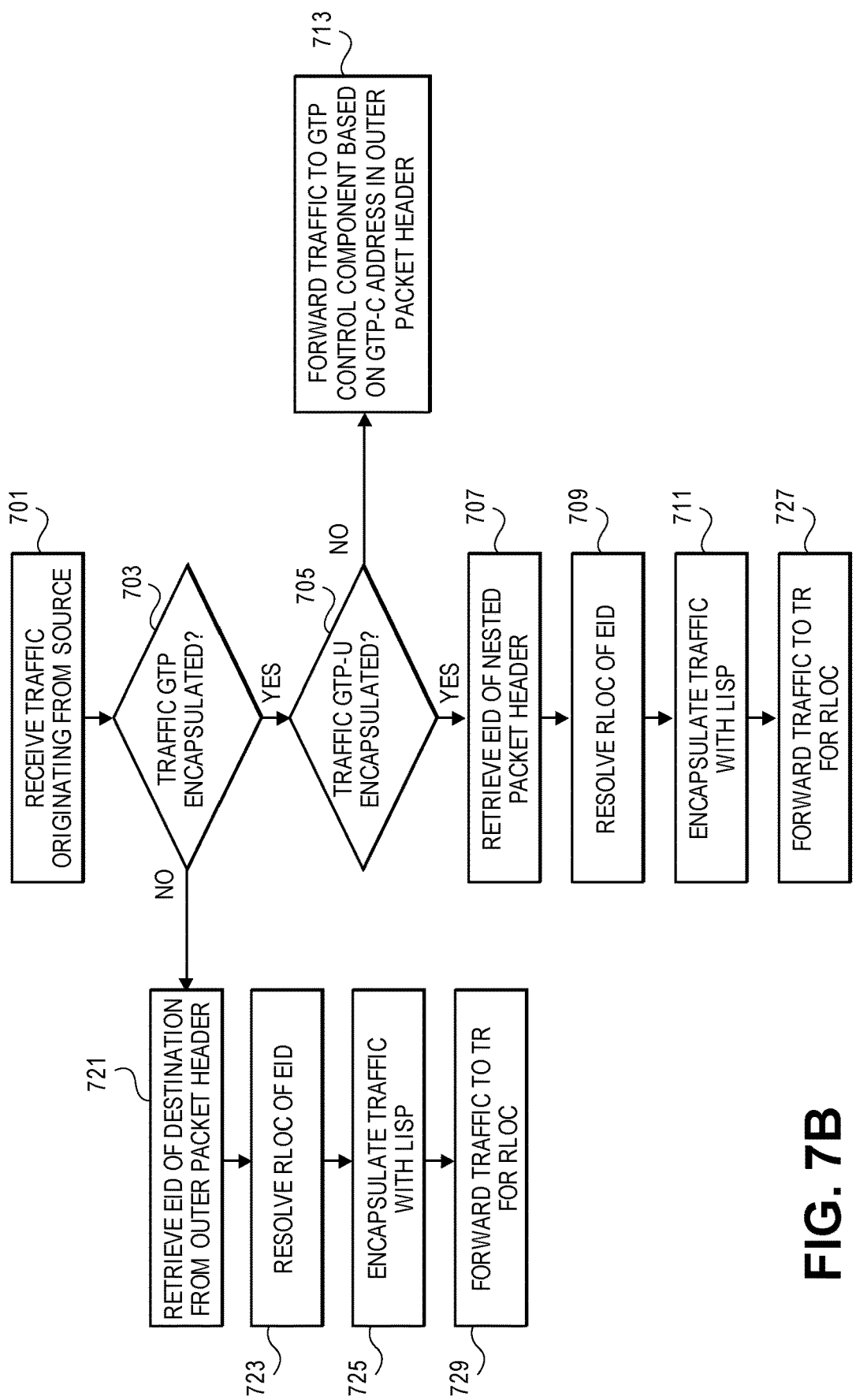
FIG. 7B is a flowchart of one embodiment of a process of an ingress TR to facilitate communication between a UE and a correspondent.

FIG. 7B is a flowchart of one embodiment of a process of an ingress TR to facilitate communication between a UE and a correspondent. The process is initiated when traffic is received originating from the correspondent or similar source (Block 701). The received traffic is examined to determine whether it is GTP encapsulated traffic (Block 703).

If the received traffic is not GTP encapsulated, then it is native (e.g., IP) traffic. In this case, the destination address in the packet header is the EID to use for further processing (Block 721). The destination EID is resolved to determine the RLOC of the egress TR (Block 723). The ingress TR may LISP encapsulate the traffic (Block 725). The traffic is then forwarded via LISP to the egress TR (Block 729), which then passes the traffic on to the P-GWu and/or the S-GWu to be forwarded to the UE.

If the received traffic is GTP encapsulated, then a determination is made whether it is GTP-C or GTP-U encapsulated (Block 705). If the traffic is GTP-C encapsulated, then it is to be forwarded to the GTP control components based on the GTP-C address. This is the outer IP address and the packet can be forwarded according to the service provider's forwarding and filtering policies without any use of LISP (Block 713).

If the traffic is GTP-U encapsulated, then the process extracts the destination address from the nested header, i.e., the header of the packet encapsulated in the payload of the GTP-U packet (Block 707). The correlated EID of the destination is then determined and used to resolve the RLOC (Block 709). The EID/RLOC is then used to LISP encapsulate the traffic (Block 711) and then to forward the traffic to the egress TR (Block 727).

Figure 8:
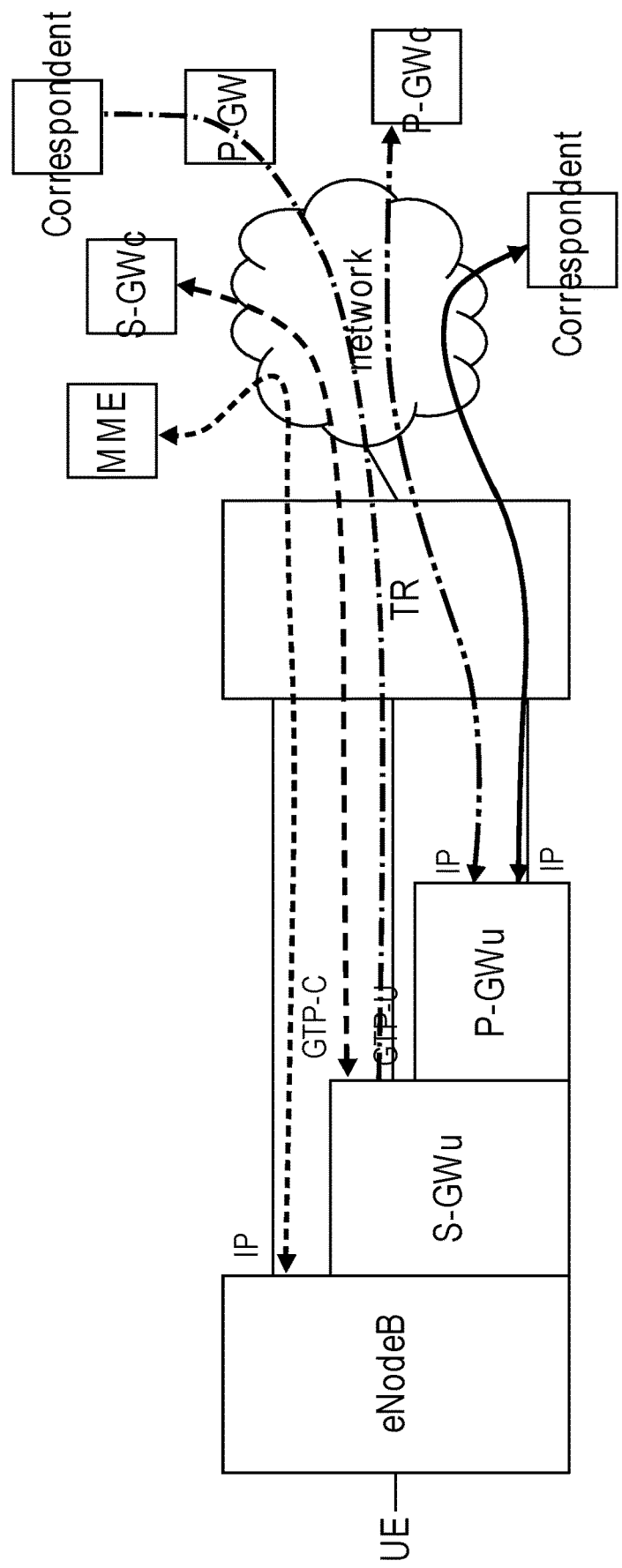
FIG. 8 is a diagram of one embodiment showing the communication routes and types between the components of the network.

FIG. 8 is a diagram of one embodiment showing the communication routes and types between the components of the network. The illustration shows that a TR co-located with distributed S-GWu and P-GWu at an eNodeB may see inbound traffic that may be addressed to any of three entities. Non-GTP traffic is addressed to a UE's EID, which is delivered to the P-GWu component. GTP-U encapsulated traffic addressed to the S-GWc EID is delivered to the S-GWu component. GTP control traffic addressed to the eNodeB's EID is delivered to the eNodeB. The three entities may communicate with any of a P-GWs, S-GWc, P-GWc, MME, correspondent or similar entities. Communication between the eNodeB and MME may be via IP or similar protocol. The S-GWu may communicate with the S-GWc or a correspondent using GTP-C or GTP-U, respectively, with LISP encapsulation. The P-GWu may communicate with a P-GWc or correspondent using IP, or in other embodiments via GTP-C or GTP-U with LISP encapsulation.

The embodiments have been described with an example of a LISP domain that corresponds to a single S-GW serving area. However, it is possible that the LISP domain can be tied to more than one S-GW serving area in the interest of scaling the S-GWc implementation. There would not be a handoff between S-GWs within the LISP domain exposed to home network P-GWs as the underlying mechanisms in LISP make this unnecessary. In further embodiments, a tracking area could be instantiated as a subset of the LISP domain by the S-GWc and/or a mobile to mobile convergence (MMC) entity that the UE is associated with. In further embodiments, additional EPC components could be distributed and co-located with the S-GWu and P-GWu at the eNodeB. As long as an EID of the UE maps to a correct RLOC for the eNodeB, the associated GWs in a distributed architecture are reachable via the same RLOC, thus there is a 1:1 correspondence between the eNodeBs and any distributed GWs. The distributed GWs are instanced on a per UE basis.

Figure 9:
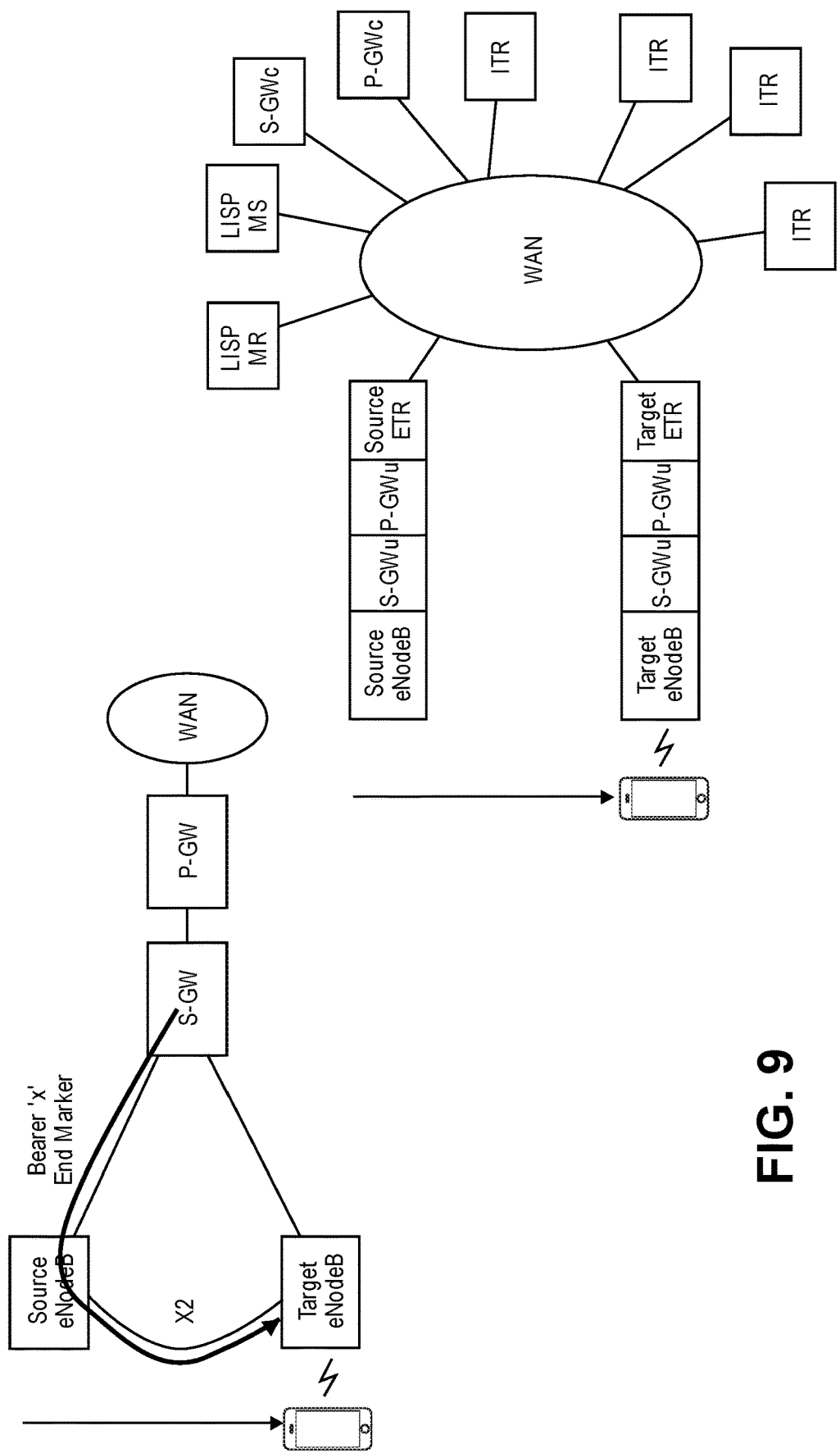
FIG. 9 is a diagram of one embodiment of a handover process.

FIG. 9 is a diagram of one embodiment of a handover process. The standard 3GPP architecture is shown on the left. In a handover scenario, the UE drops its connection with the source eNodeB and starts a connection with the target eNodeB. At this point the source eNodeB re-directs all downstream bearer traffic for the UE to the target eNodeB via the X2 interface. This traffic is typically buffered at the target eNodeB until the UE attaches to it. When the S-GW is notified that the UE has attached to the target eNodeB, the S-GW will switch sending UE traffic directly to the target eNodeB instead of the source eNodeB. At this time, the S-GW sends an end marker to the source eNodeB to signal the end of communications via the source eNodeB for each bearer transiting the S-GW. The source eNodeB relays each bearer's end marker to the target eNodeB to complete the transition. At this point, the source eNodeB may choose to recover state associated with the re-direction of the bearer to the target eNodeB. The target eNodeB may perform its own unique actions. For example, it may have buffered traffic for a given bearer received directly from the S-GW until seeing an end marker for that bearer indicating all older traffic sent via the source eNodeB had been received. That traffic sent directly from the S-GW to the target eNodeB may arrive before older traffic sent via the source eNodeB and may result as a consequence of differential queuing delays in the network.

However, in the architecture of the embodiments herein, the mobility as a function moves from in front of the GWs to behind them. In other words, the TRs play a role in the mobility before the traffic reaches the distributed S-GWs and P-GWs, thus, the TRs must play a role in signaling with the UE and eNodeB regarding the handover and must assume the role of coordinating between the source TR and the target TR to make handover hitless. As shown on the right, there are multiple ingress TRs (ITRs) or P-GWs that enable communication with various correspondents. Thus, the source egress TR (ETR) and target egress TR must manage the uncoordinated handover of these individual communication flows making the generation and handling of end markers by recipients more complicated.

The handoff is considered "break before make." The handoff results in a simplification of the UE in that it is not required to maintain multiple radio connections simultaneously, but instead places additional requirements on the network. 3GPP procedures such as X2 assisted handoff are designed to mitigate the effects of this, however as specified would be inadequate to deal with LISP as a mobility mechanism. The embodiments are expanded to support seamless handoff between TRs, to provide the function that 3GPP specified LTE does (X2 handover as an exemplar). At the same time, the expanded support does not rely on the current 3GPP architectures inefficiencies in the form of anchor points, and bearer setup. The embodiments include extensions to LISP operation to permit a lossless handoff and to permit coordination of LISP TRs with 3GPP specified handoff processes.

In a 3GPP handoff a handover request has knowledge of the source and target eNodeBs. With knowledge of the target eNodeB, the TR associated with the source eNodeB can use the LISP mapping system to resolve the target TR RLOC and can then coordinate the handoff with it and be able to redirect traffic sent prior to synchronization of other systems with the new EID/RLOC binding. This involves additional messaging, including example message types and processes as described further herein below.

The embodiments seek to provide a handoff process that minimizes loss, buffering and blocking of traffic. The embodiments include a handoff process that may involve some traffic being buffered when no connectivity exists from the source TR to the UE and from the UE to the target TR. Buffering at the UE of upstream traffic, during the period that the UE is changing connectivity from the source eNodeB to the target eNodeB, is not problematic as it is the end-system performing the buffering, not an intermediate system, and therefore is not required to deal with packets in flight. To minimize blocking/buffering, the source TR maintains communication with the UE until the moment the UE disconnects. When the UE disconnects, the source TR will immediately start redirecting traffic to the target TR. The handover process involves an exchange of information or 'handshake' that is designed such that the source TR and target TR have a priori knowledge of the intended handover sequence. The target TR thereby can expect traffic related to the handover process and so it does not simply silently discard it.

The embodiments provide a trigger for updating the LISP mapping system. The trigger encompasses a "connect" at the target TR, which fits the model of the TR performing the update and is also the RLOC now associated with the EID. The connect can be considered a trigger for a reoptimization process where the dogleg route far_end_correspondents→source_TR→target_TR can be simplified to far_end_correspondents→target_TR.

Figure 10:
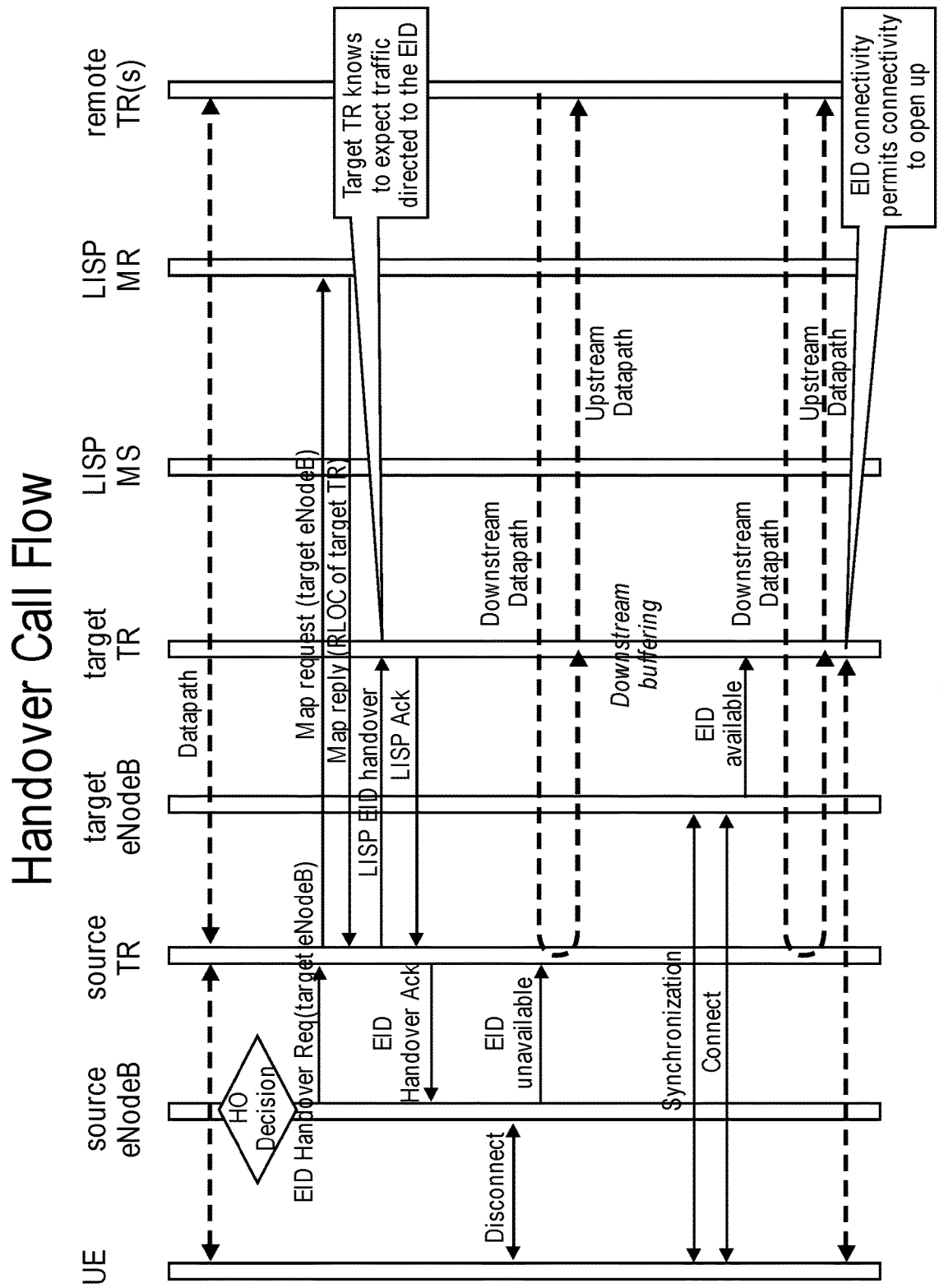
FIG. 10 is a diagram of one embodiment of the handover process call flow.
Figure 11:
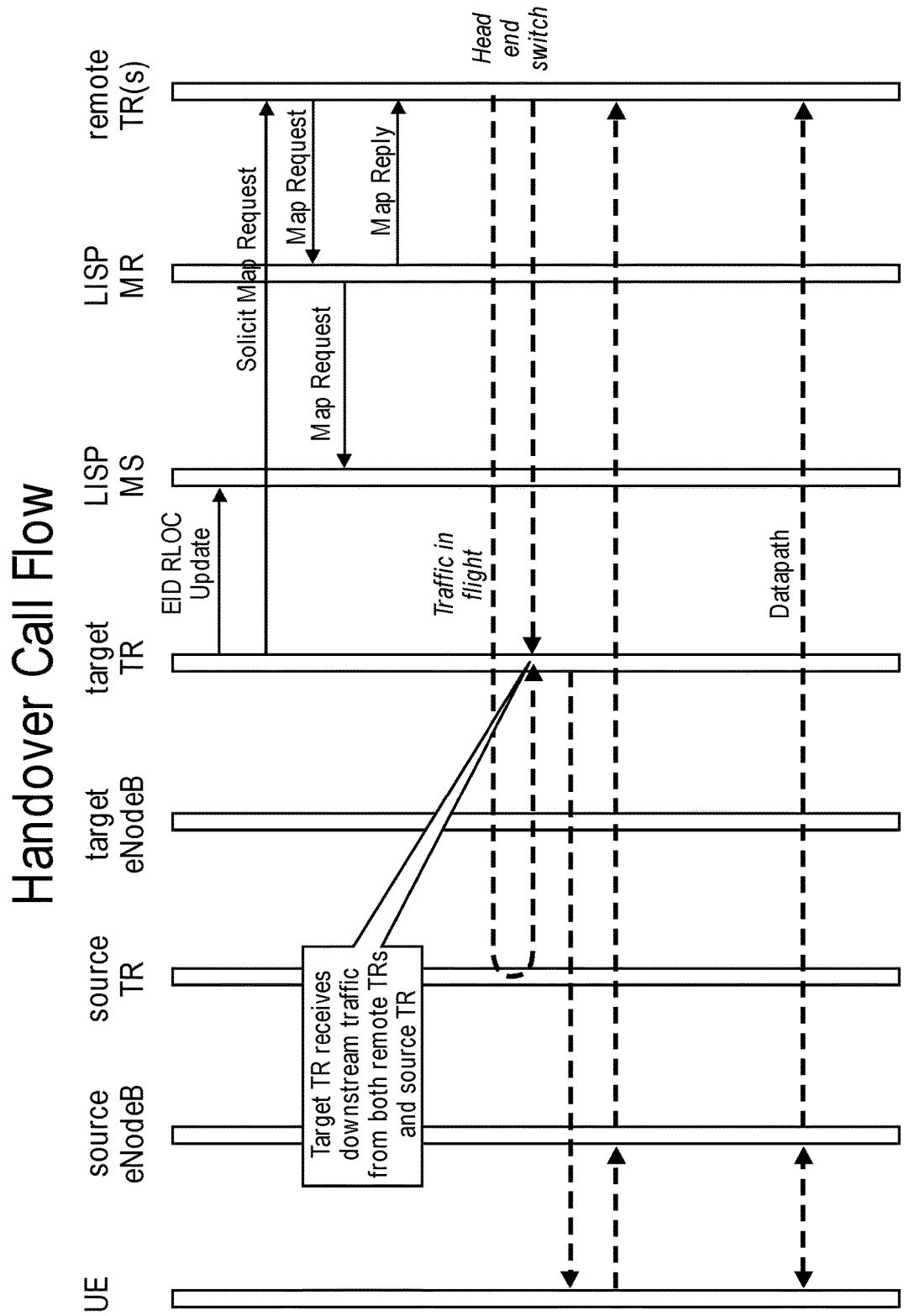
FIG. 11 is a diagram of additional calls in the handover process call flow.

FIGS. 10 and 11 together form a diagram of one embodiment of the handover process call flow. The calls effected by the source TR and target TR are further discussed in relation to the flow charts in FIGS. 12A and 13A, respectively. The call flows only illustrate the entities involved in the LISP handoff. Thus, other entities and calls related to the overall handover process may not be illustrated for sake of clarity. For example, the call flows do not illustrate the 3GPP messaging with the MME, S-GW, and P-GW. As is common and well understood practice, all transactions are acknowledged, and if a transaction initiator does not receive an acknowledgement in a specified time interval, will retry the transaction. This can repeat for a specified number of times before the operation is considered to have failed.

The handover (HO) decision is made with the 3GPP system whereby the target eNodeB that will subsequently serve the UE is identified. When the eNodeBs and S-GWs received a notification of the initiation of mobility, it triggers the associated TRs to start the processes shown in FIGS. 10-13. Such initiations include but are not limited to radio measurements communicated by the UE to the source eNodeB. Upstream traffic is not a problem as either the UE is attached to the network or buffering traffic during handover, thus the handling of upstream traffic is not illustrated in detail.

Figure 12A:
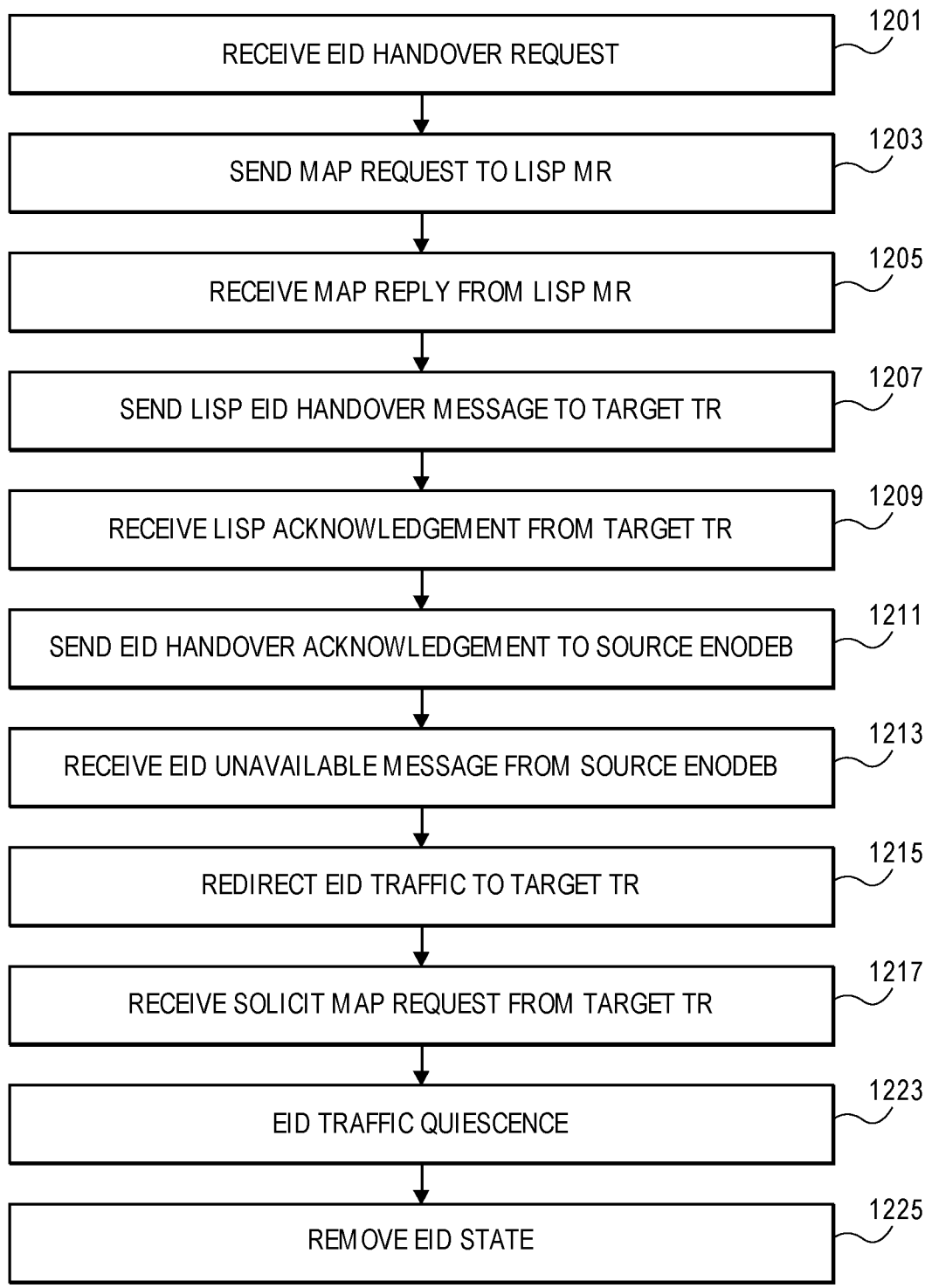
FIG. 12A is a flowchart of one embodiment of the process for handover at a source tunnel router.
Figure 13A:
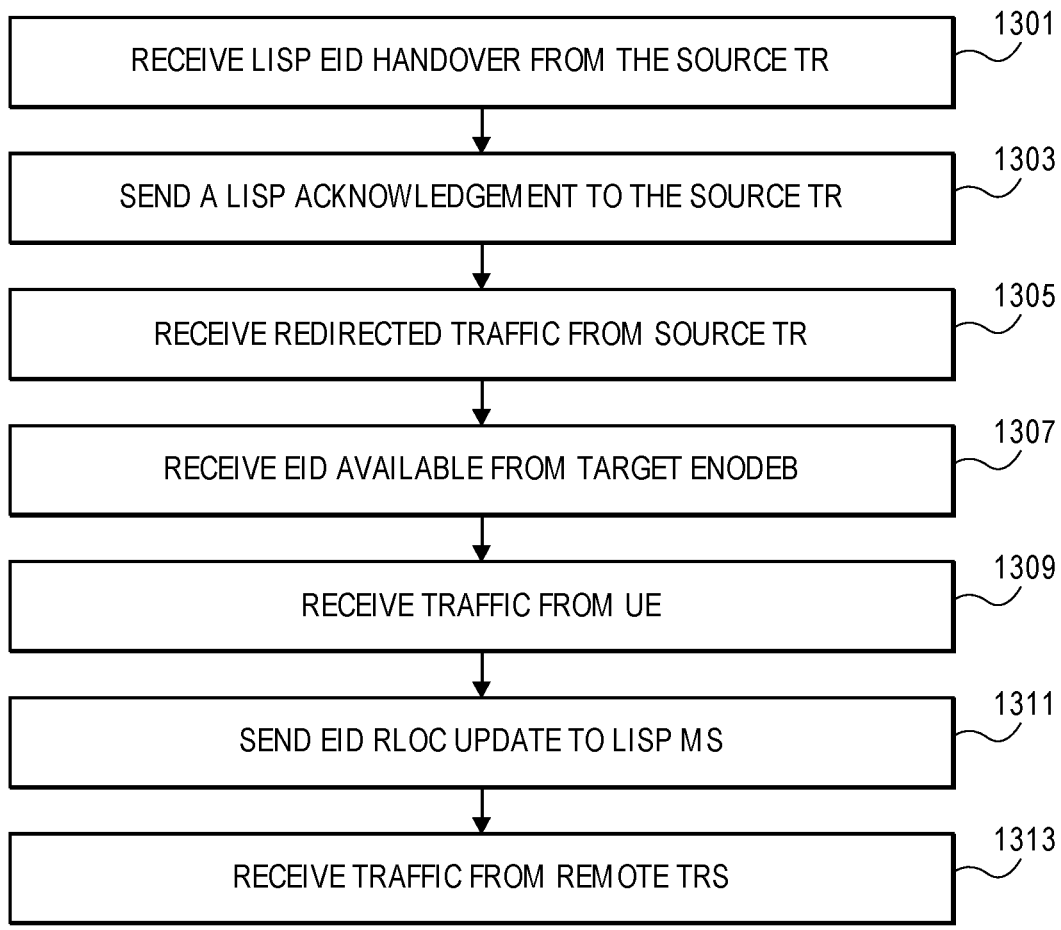
FIG. 13A is a flowchart of one embodiment of the process for handover at a target tunnel router.

The diagrams of FIGS. 10 and 11 illustrate the sequence of message exchange between components from the top down, such that the messages at the top generally take place before or concurrently with those further down. FIGS. 12A and 13A are flowcharts specific to the source TR and target TR, respectively. Initially, as illustrated, a datapath exists between the UE and the source TR and similarly between the source TR and the remote TRs that serves the correspondent for a given communication flow. Subsequently a handover (HO) decision is made to transition the UE to a target eNodeB. The MME sends an EID handover request identifying the target eNodeB to the source TR (Block 1201). This triggers the source TR to engage in the handover process.

The source TR generates a map request message identifying the target eNodeB, which is sent to the LISP MR (Block 1203). The LISP MR, which the target eNodeB has previously registered with, replies with the RLOC of the target TR associated with the identified target eNodeB (Block 1205). The source TR then sends a LISP EID handover message to the target TR (Block 1207). The target TR when receiving this message (Block 1301) receives information about the EID of the UE and/or correspondent that are communicating and that will be transitioning to the target TR. Thus, the target TR can now expect to receive traffic from the correspondent destined for the EID of the UE. The target TR acknowledges this information by sending a LISP acknowledgement message to the source TR (Block 1303). The source TR receives the LISP acknowledgement message which lets it know that the target TR is ready for the traffic directed toward the EID of the UE from the correspondent (Block 1209).

The source TR then sends an EID handover acknowledgement to the source eNodeB (Block 1211) thereby signaling to the source eNodeB that the source and target TRs are prepared for the transition. The source eNodeB at this time advises the UE that the network is ready for the handover with a connection reconfiguration request. The UE may disconnect from the source eNodeB at any time, for sake of clarity it is presented as disconnecting at this point in the sequence. At that time the source eNodeB signals the source TR that the EID has become unavailable (Block 1213). In response, the source TR begins to redirect any traffic received from remote TRs associated with the correspondent and directed to the EID toward the target TR (1215). The target TR is expecting the redirected traffic and can buffer it until the UE is available with its associated target eNodeB (Block 1305).

The UE synchronizes and connects with the target eNodeB, which then sends an EID available message to the target TR (Block 1307). This may happen independently of the other operations and not necessarily in this specific sequence, which is presented for sake of clarity and conciseness. With the EID available, then the target eNodeB and target TR may receive upstream traffic from the UE (Block 1309). The target TR sends an EID RLOC update to the LISP MS (Block 1311) to notify the LISP mapping system that the EID of the UE is now associated with that target TR. In some embodiments, the source TR may issue solicit map request messages to all correspondent TRs. In another embodiment, the target TR may be the issuer of solicit map request messages, e.g., to the correspondent TRs and to the source TR (Block 1217), and does so immediately upon updating the mapping system. It is able to do this on the basis of correspondent information communicated in the LISP EID Handover message. Remote TRs may respond with map requests to the LISP MR, which in turn sends a map request to the LISP MS. A map reply is sent from the LISP MR to the remote TRs.

The source TR can then monitor or start a timer for the communication flow for the handed off EID and when quiescence is reached (Block 1223) then the communication flow need no longer be tracked and/or any state related to it can be dropped (Block 1225). In the meantime, all communication between the EID and correspondent will have shifted to direct communication from correspondent (remote) TRs and the target TR (Block 1313).

The embodiments can utilize a set of additional messages for the LISP system and architecture as set forth in the example of Table I:

TABLE I

| Message | From | To | Information | Purpose |
| --- | --- | --- | --- | --- |
| EID Handover Request | Source eNodeB | Source TR | Target eNodeB, EID | To request a mobility handover of the LISP system |
| EID Handover Ack | Source TR | Source eNodeB | Some information to permit Ack to be correlated with the request | To make the EID handover request reliable |
| LISP EID Handover Request | Source TR | Target TR | Target TR, EID | To advise the target TR that an EID will move to it |
| LISP EID Handover Ack | Target TR | Source TR | Some information to permit Ack to be correlated with the request | To make the LISP EID handover request reliable |
| EID Available | eNodeB | Local TR | EID | To advise the local TR that an EID is ready to send/receive traffic |

TABLE I-continued

| Message | From | To | Information | Purpose |
|---|---|---|---|---|
| EID Unavailable | eNodeB | Local TR | EID | To advise the local TR that an EID is not ready to send/receive traffic |

These messages are for a client system to inform the LISP system of pending handoff and for the LISP system to perform the associated inter-TR coordination that is required to facilitate the handover. If you look at the original architecture, you can envision a set of 3GPP entities both associated with and co-located with the eNodeB (S-GW and P-GW).

The handover process of the embodiments can be utilized with a variety of similar architectures and has been provided by way of example and not limitation. As long as the EID of the UE maps to the correct RLOC for the attached TR, the associated GWs in a distributed architecture are also reachable via the same RLOC. Although in the simplest case there is a 1:1 correspondence between the eNodeB and any GWs, the system can be expanded to incorporate more complex cases using the same principles.

The embodiments of this handover process provide various advantages over the art. By using LISP the embodiments get the benefit of shortest path forwarding for mobility management. Coordinating knowledge of pending handover with LISP permits a redirect of traffic from the source egress TR to the target egress TR via the source ingress TR once the UE is no longer reachable from the source TR, and in the process of connecting with the target TR. Informing the target egress TR of a pending handover permits it to receive and buffer traffic for an EID prior to re-attachment of the EID to the network eliminating loss Eliminating the concept of bearers (which manifest themselves as differentiated services code points (DSCPs)) permits significant simplification of the handover process. These processes collectively mitigate the effects of a "break before make" style of mobility.

Figure 12B:
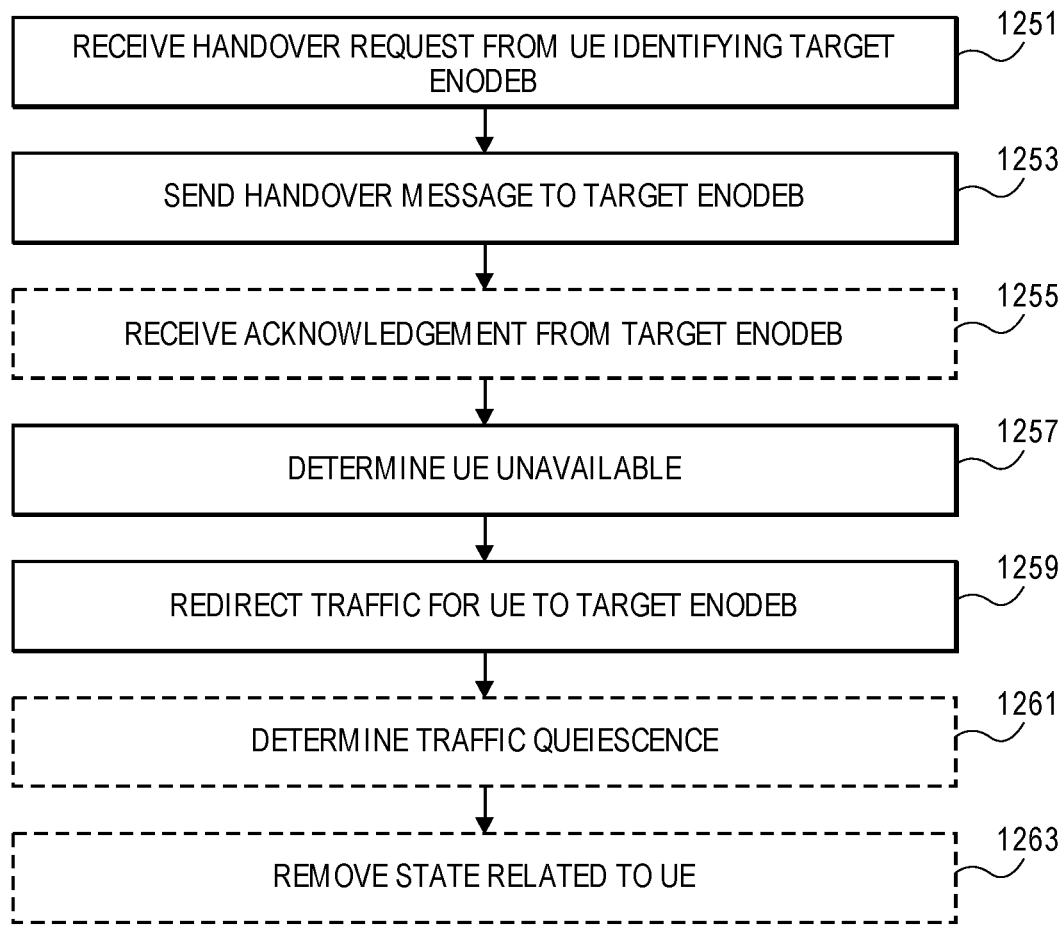
FIG. 12B is a flowchart of one embodiment of the process for handover at a source eNodeB.
Figure 13B:
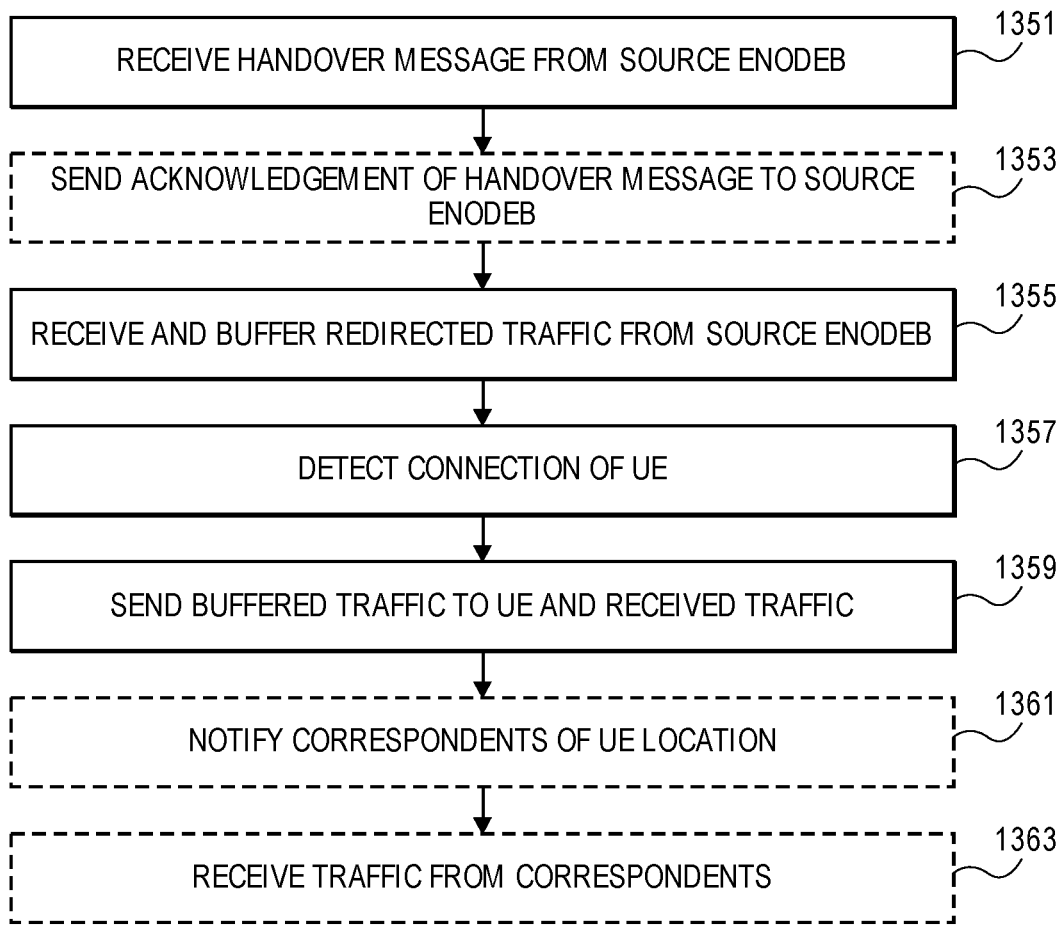
FIG. 13B is a flowchart of one embodiment of the process for handover at a target eNodeB.

FIGS. 12B and 13B are flowcharts for the handover process where the process is not tied to the specific LISP and 3GPP architecture of the examples described above. One skilled in the art would understand that the handover process described herein is compatible with other architectures to provide an improved handover between UEs and source and target eNodeBs. In some embodiments, these processes are performed by source and egress TRs at the respective eNodeBs. The process at the source eNodeB is initiated in response to the source eNodeB receiving a handover request from the UE identifying a target eNodeB that it is transferring to (Block 1251). The UE can use any system for identifying a target eNodeB for handover.

The source eNodeB sends a handover message to the target eNodeSthereby notifying it of the UE that is transferring and enabling it to prepare for traffic destined for that UE (Block 1253). The source eNodeB receives an acknowledgement from the target eNodeB of the handover message (Block 1255). In some embodiments, where an acknowledgement is not received the handover message may be resent after a timeout or similar period. The source eNodeB will continue to forward traffic to the UE until it determines that it is unavailable (Block 1257). Any mechanism, e.g., a timeout or failed ACK, can be used to determine an unavailable UE. The source eNodeB then redirects received traffic for the UE to the target eNodeB (Block 1259).

The source eNodeSthen monitors the traffic for the UE and continues to forward any received UE traffic. However, when a period of no traffic for the UE elapses indicating an end or quiescence of traffic for the UE (Block 1261), then the source eNodeB can remove state related to the UE and no longer needs to redirect traffic to the target eNodeB (Block 1263).

A complementary process is shown in FIG. 13B as implemented by the target eNodeB. The process at the target eNodeB begins when the target eNodeB receives a handover message from the source eNodeB (Block 1351). The target eNodeB responds with an acknowledgement of the handover message to the source eNodeB (Block 1353). The target eNodeB then begins to receive traffic destined for the UE that is part of the handover process, which is buffered until the UE connects with the target eNodeB (Block 1355). The target eNodeB will then detect a connection of the UE using any mechanism (Block 1357) and notify the target eNodeB.

The traffic for the UE that has been buffered is then sent to the UE along with any traffic that is received in an ongoing basis from the source eNodeB (Block 1359). At this time or in parallel, the target eNodeB notifies the correspondent devices of the new location and availability of the UE (Block 1361). The target eNodeB then receives traffic for the UE from all the correspondents directly (Block 1363).

Figure 14:
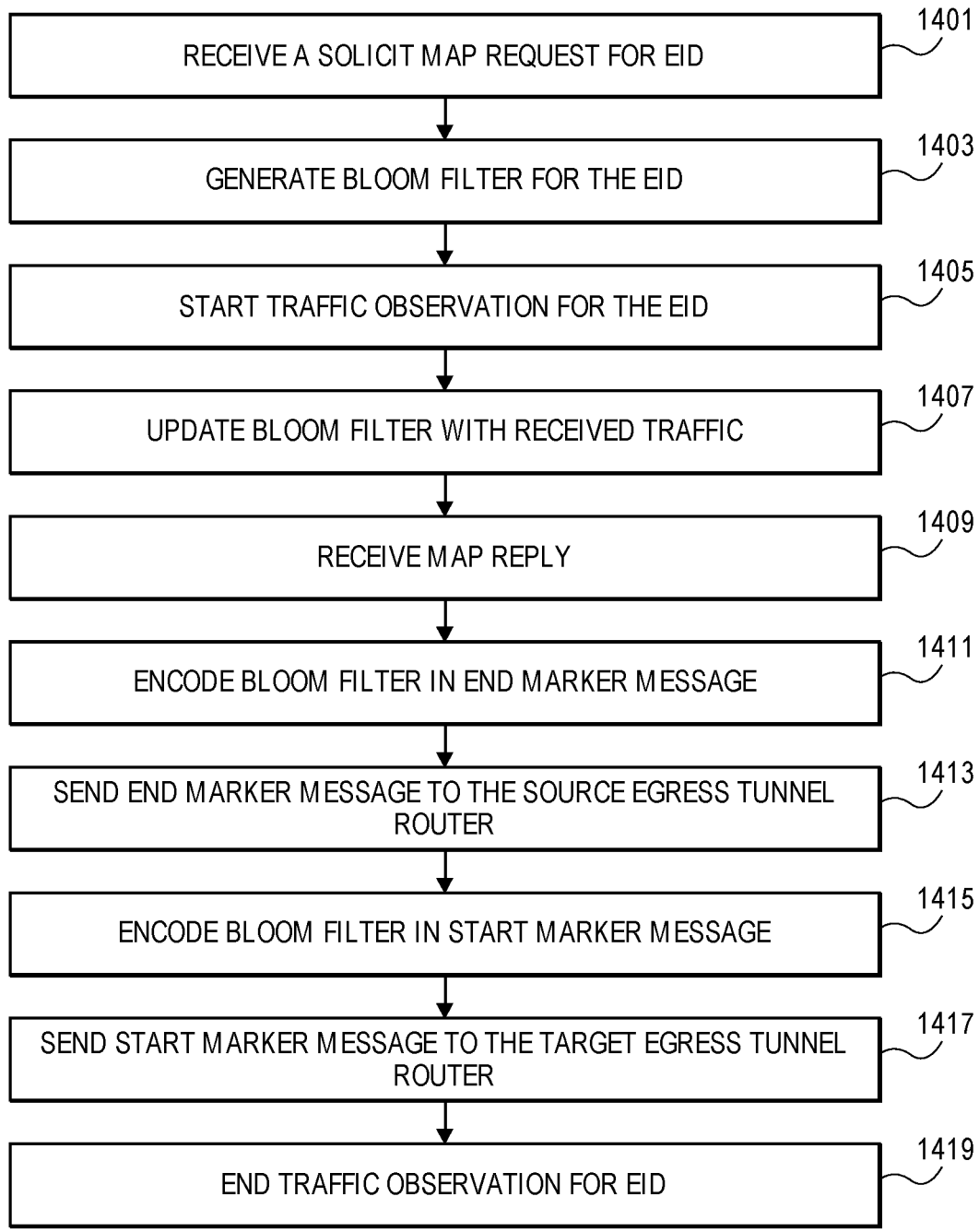
FIG. 14 is a flowchart of one embodiment of the process for an ingress TR to support lossless handover using end and start markers.

FIG. 14 is a flowchart of one embodiment of the process for an ingress TR to support lossless handover using end and start markers. During a handover from one eNodeB to another, it is desirable to preserve packet ordering. This is not considered to be a problem upstream, as a UE has an upstream path or is buffering at the source. The architecture also assumes the time to make a handover minimizes the probability of misordering of traffic upstream.

As discussed above, the use of an end-marker is the current technique used to achieve packet order in a 3GPP X2 handover. 3GPP LTE uses an "end-marker" transaction to identify to the eNodeBs when the last packet on a GTP tunnel has been received. It is inserted by the S-GW into the GTU-U tunnel to the source eNodeB immediately prior to switching traffic to a GTP-U tunnel to the target eNodeB. The source eNodeB uses an X2 handover tunnel to relay the end-marker to the target eNodeB. It is per bearer identified by the tunnel identifier (TID). Thus, the end marker is associated with both a set of flows identified by a tunnel endpoint identifier (TEID), that share a common class of service identified via a specific DSCP. The end marker has a single source, the S-GW transited by that GTP tunnel/TID. During the course of the handover, the target eNodeB may block traffic on the new GTP tunnel from the S-GW until it sees an end-marker on the X2 handoff tunnel from the source eNodeB. This avoids potential re-ordering of traffic on that bearer. Both the source eNodeB and the target eNodeB may use the end-markers to know when an X2 handoff tunnel for the associated bearer may be torn down as well.

In a distributed S-GWu or P-GWu situation the source of any end-marker is pushed out to a number of uncoordinated ingress TRs surrounding the core network. The ingress TRs are the devices in the network doing the head end switch. Thus, there is no identifiable single source of an end-marker for traffic destined for a given UE and its EID. An end-marker is only useful if a target eNodeB can identify when "all of them" have been received. The embodiments do not extend the concept of 3GPP bearers into the core network, thus there is no corresponding control plane information to map to data plane behavior. Thus, an ingress TR does not explicitly know via bearer set up what DSCP values for a UE it needs to send end-markers and therefore this needs to be established by other means. There are not necessarily TIDs in the packets that explicitly identify flows. A distributed S-GWu or P-GWu is LISP unaware, but the head end switch is a LISP operation.

In some embodiments, blocking of flows will be implemented at a target egress TR. These embodiments will minimize latency in comparison to blocking at an ingress TR, and can account for traffic in flight. Such coordination of blocking and unblocking can be achieved by data plane transactions that are subject to the same queuing discipline when forwarded from the ingress TR to the egress TR.

The embodiments seek to preserve flow ordering during a handoff. As such they do not seek to block new flows directed to the UE that arrive after an ingress TR has switched from the source to the target egress TR RLOC. For example, in comparison, a solution that simply used a per ingress TR end marker discipline would not work. The embodiments provide a process that is reasonably robust while not depending on reliable transmission. The solution of the embodiments works at a "per flow" granularity independent of the ingress TRs. For example, simultaneous handoff does not circumvent the system. Traffic from a correspondent may change ingress TRs at the same time as a local handoff is occurring.

Returning to FIG. 14, the embodiments provide a specific set of ingress TR procedures that should be understood in the context of the handover process described above with reference to FIGS. 10 through 13. When an ingress TR receives a solicit map request for an EID (Block 1401), the ingress TR starts tracking the traffic directed to that EID and builds a bloom filter representative of the set of flows (Block 1403) directed from the TR towards the specific EID. This is accomplished using one or more hashes of the flow identifier modulo the filter size and setting the corresponding bits in the filter. As the EID for traffic to a UE will be invariant, the filter can be built using the source EID, transport protocol, source port, and destination port relationships, which for the purposes of minimizing the possibility of collisions would provide a useful amount of entropy. The observation of the traffic and tracking is referred to herein as the "traffic observation window" (Block 1405). The traffic observation window may be configured to have a minimum duration of time. In some embodiments, any active flows that are not observed in the traffic observation window have a sufficiently large inter-packet gap to not worry about misordering due to differential delay across the network.

When the ingress TR receives a map reply (Block 1409) and has observed traffic for the minimum configured duration and continued to track the traffic with the bloom filter (Block 1407) during the traffic observation window, then the ingress TR initiates the process to update the EID/RLOC table and encodes the bloom filter in an "end marker" message (Block 1411) and sends this to the source egress TR (Block 1413). The ingress TR also encodes the bloom filter in a "start marker" message (Block 1415) and sends this to the target egress TR (Block 1417). The ingress TR can then terminate observing traffic for the EID (Block 1419).

Figure 15A:
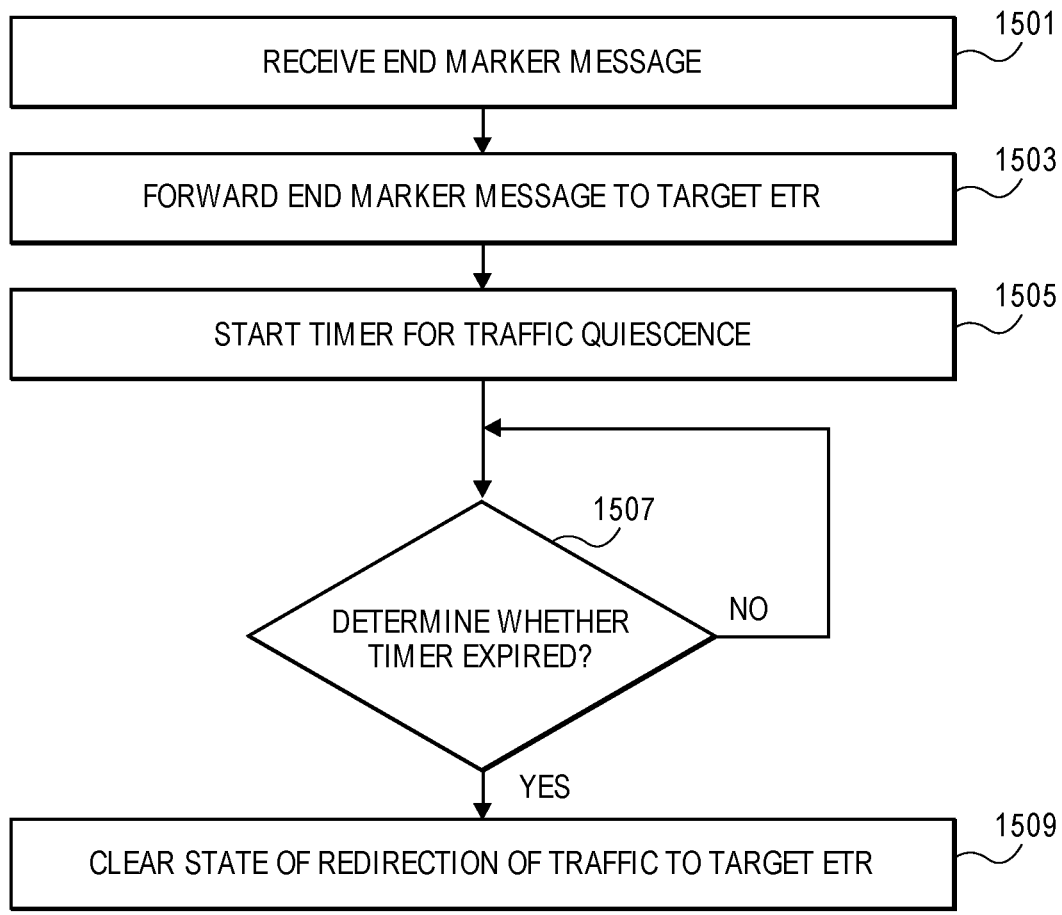
FIG. 15A is a flowchart of one embodiment of the process for a source TR to handle markers for a handover.

FIG. 15A is a flowchart of one embodiment of the process for a source TR to handle markers for a handover. In the embodiments discussed herein above, when the UE disconnected from the source eNodeB, the source TR was notified, and began redirecting all traffic received for the UE's EID via its ingress TR to the target egress TR. This role can alternately be referred to as an RTR (re-encapsulating tunnel router). It may be expected that an end marker message would simply follow the same path. However, there is not an obvious criteria for the source egress TR to remove state associated with the re-directed traffic, because the source TR would not necessarily know when the last end-marker had been relayed. In some embodiments, a timeout after re-directed traffic quiesces is sufficient to determine when to remove state.

In the flowchart, this process is shown where a source TR is redirecting traffic to a target TR. The source TR may receive any number of end marker messages (Block 1501) from any number of ingress TRs and similar sources. These end marker messages are forwarded to the target egress TR (Block 1503). When any traffic directed to the EID is forwarded, the source TR can start a timer to monitor for traffic quiescence (Block 1505). The process can check for the expiration of the timer (Block 1507) and may reset the timer if further end markers or traffic are received. When the timer expires, the state related to the communication flows destined for an associated EID of the UE that was handed over can be removed (Block 1509).

Figure 15B:
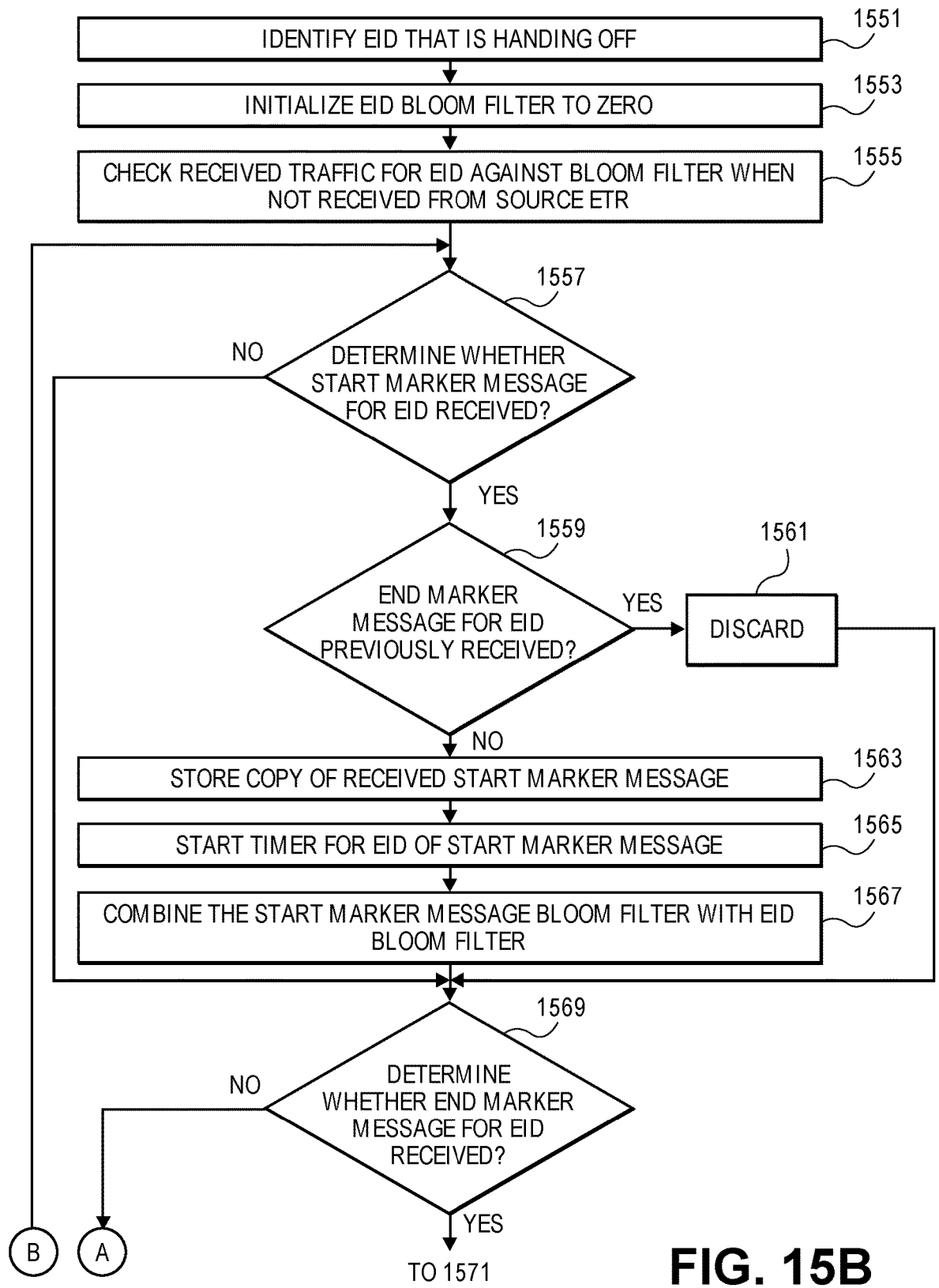
FIG. 15B is a flowchart of one embodiment of the process for a target TR to handle markers for a handover.
Figure 15B:
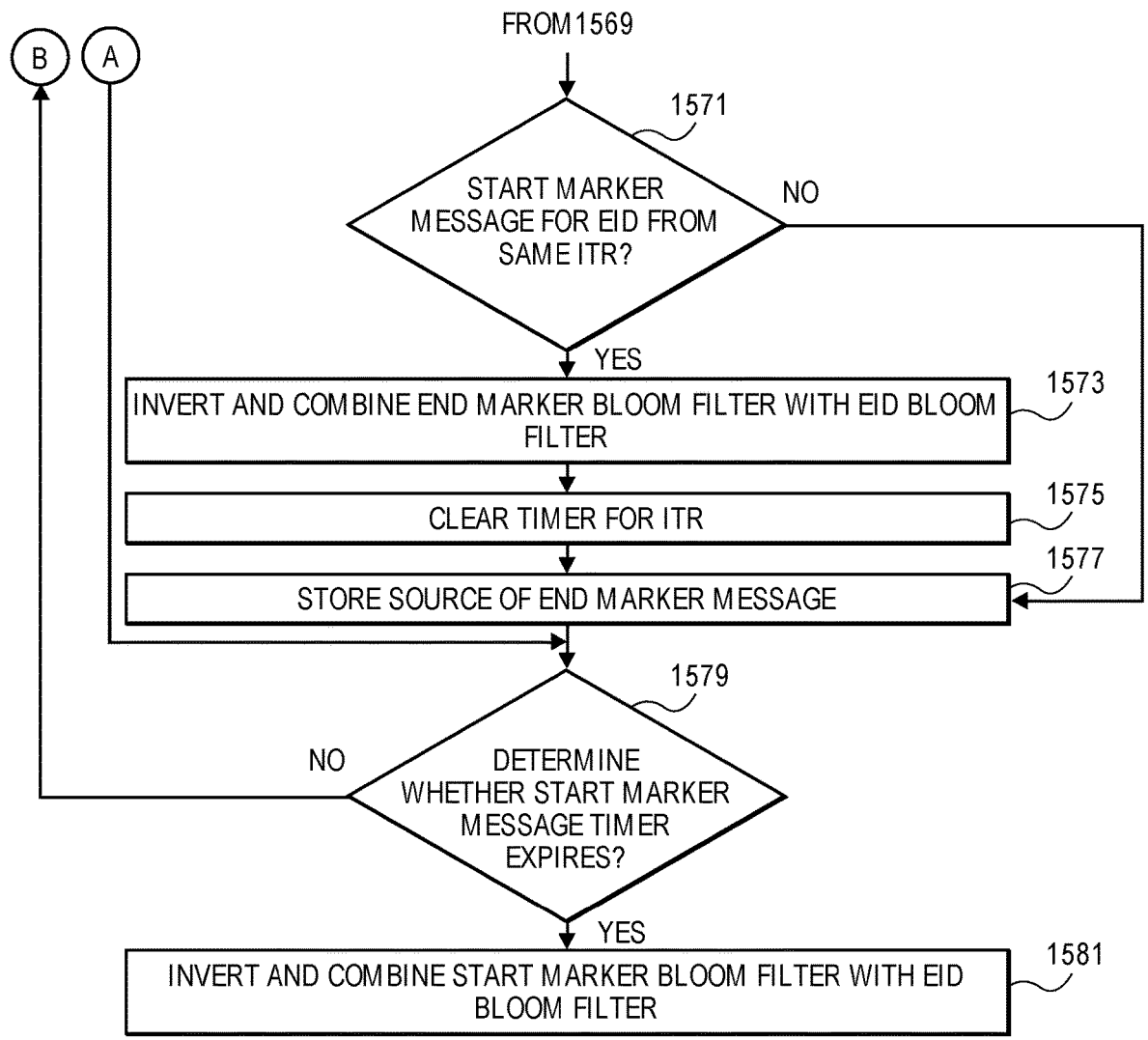

FIG. 15B is a flowchart of one embodiment of the process for a target TR to handle markers for a handover. When a target egress TR becomes aware an EID is being "handed off" (Block 1551) as a consequence of an EID handover request, the egress TR initializes an EID bloom filter to zero thereby indicating "do not block anything" (Block 1553). A bloom filter is a data structure where one application is to test whether an element is a member of a group or set. It is used here by adding end markers to the set 'tracked' by the bloom filter, to identify those flows that have completed their transition. Any packets received directed to the EID from other than the source egress TR are checked against the EID bloom filter and if a hit occurs (i.e., a match is found for the packet), the packet is queued, else the packet is forwarded (Block 1555).

For any start-marker transaction received for an EID, the process checks whether an end-marker has not already been received from that ingress TR (Block 1557 and 1559). If previously received, then the start marker is ignored (Block 1561). If the end-marker has not been previously received, the target egress TR stores a copy of the ingress TR's start-marker and starts a timer associated with it (Block 1563 and 1565). The target egress TR then combines (e.g., logically ORs) the start marker bloom filter with the EID bloom filter (Block 1567).

The process checks for any end-marker transaction received for an EID (Block 1569). If a start-marker is received from the same ingress TR (Block 1571), then the egress TR takes the inverse of the end-marker bloom filter and combines it (e.g., ANDs it) with the EID bloom filter (Block 1573). Any blocked flows unblocked by the cleared filter bits are released for forwarding, and the process cancels any timers associated with the ITR's start marker (Block 1575) before saving (Block 1577). If the start marker has not already been received from the same ingress TR, then the egress TR remembers the source of the end-marker (Block 1577).

After the source of the end-marker message is stored (Block 1577) or when it is determined that an end-marker transaction has not been received for the EID (Block 1569), a check is made for when a timer associated with a start-marker expires (Block 1579). If the timer has not yet expired, the process returns to checking whether any start-marker transaction has been received for the EID (Block 1557). When the timer expires, then the target egress TR combines (e.g., logically ANDs) the inverse of the start marker bloom filter with the EID bloom filter (Block 1581). This ensures that the loss of an end marker does not unreasonably disrupt traffic forwarding.

In other embodiments, blocking could be maintained per ingress TR in order to eliminate the probability of collisions between the bloom filters of multiple ITRs, and potential race conditions between start and end markers. However, this would then mean that blocking was ineffective during simultaneous handover of both the local EID and a correspondent. Completely avoiding any blocking or filter operations for a given ingress TR if its end marker arrives before its start marker reduces the probability of collisions between ingress TR bloom filters. The embodiments assume that the number of correspondents is comparatively small for a single UE such that the probability of collisions in the encoding of correspondents in the bloom filter is small.

FIG. 16 is a diagram of one embodiment of the handling of a filter collision during a handover process. The diagram is not exhaustive in the scenarios where collisions may occur. The possible outcomes for a given sequence occur when there is a bloom filter collision with multiple ingress TRs communicating with the same EID being handed over to the target egress TR.

Figure 17:
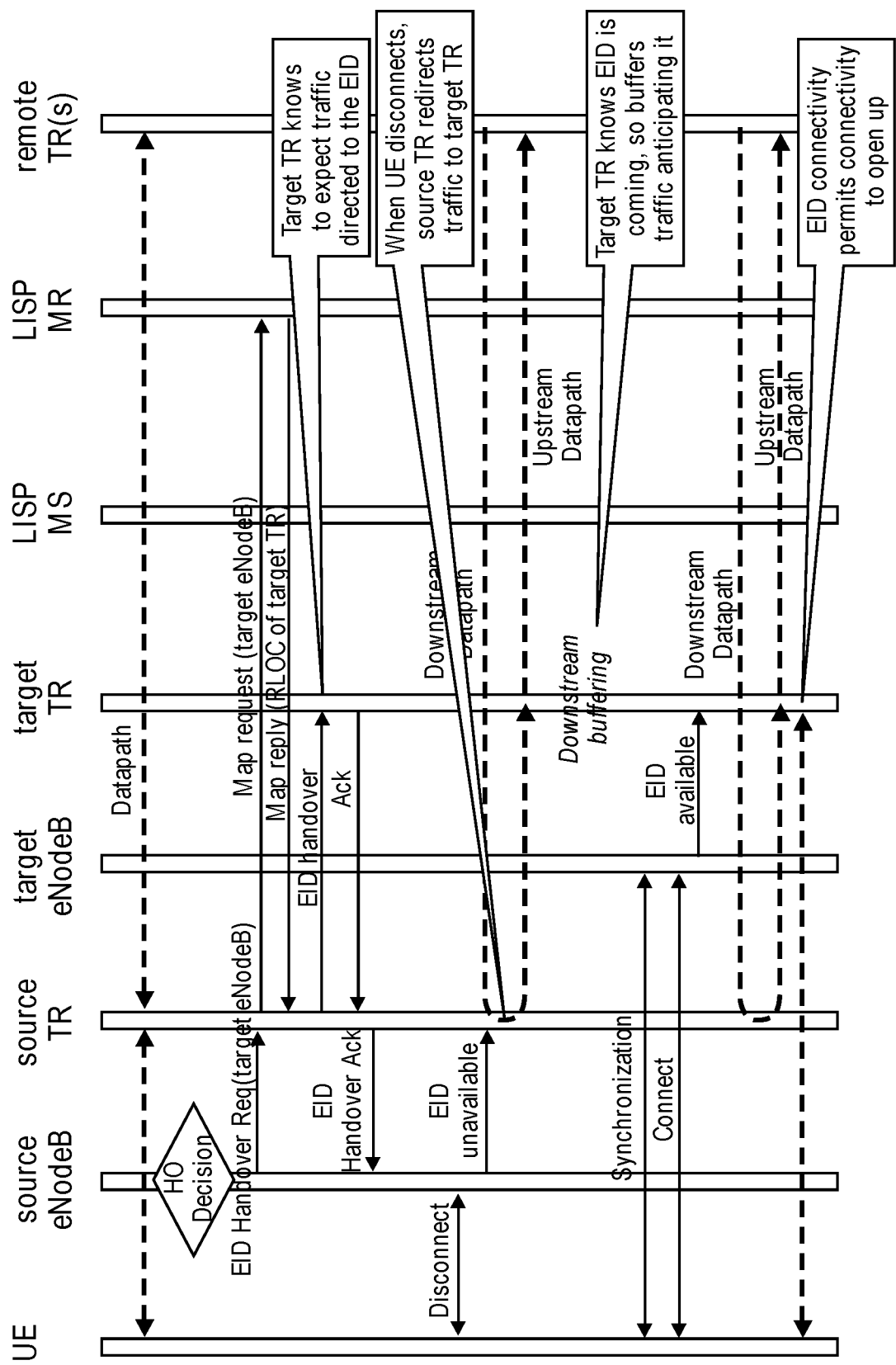
FIG. 17 is a diagram of one embodiment of the process for handover using markers.
Figure 18:
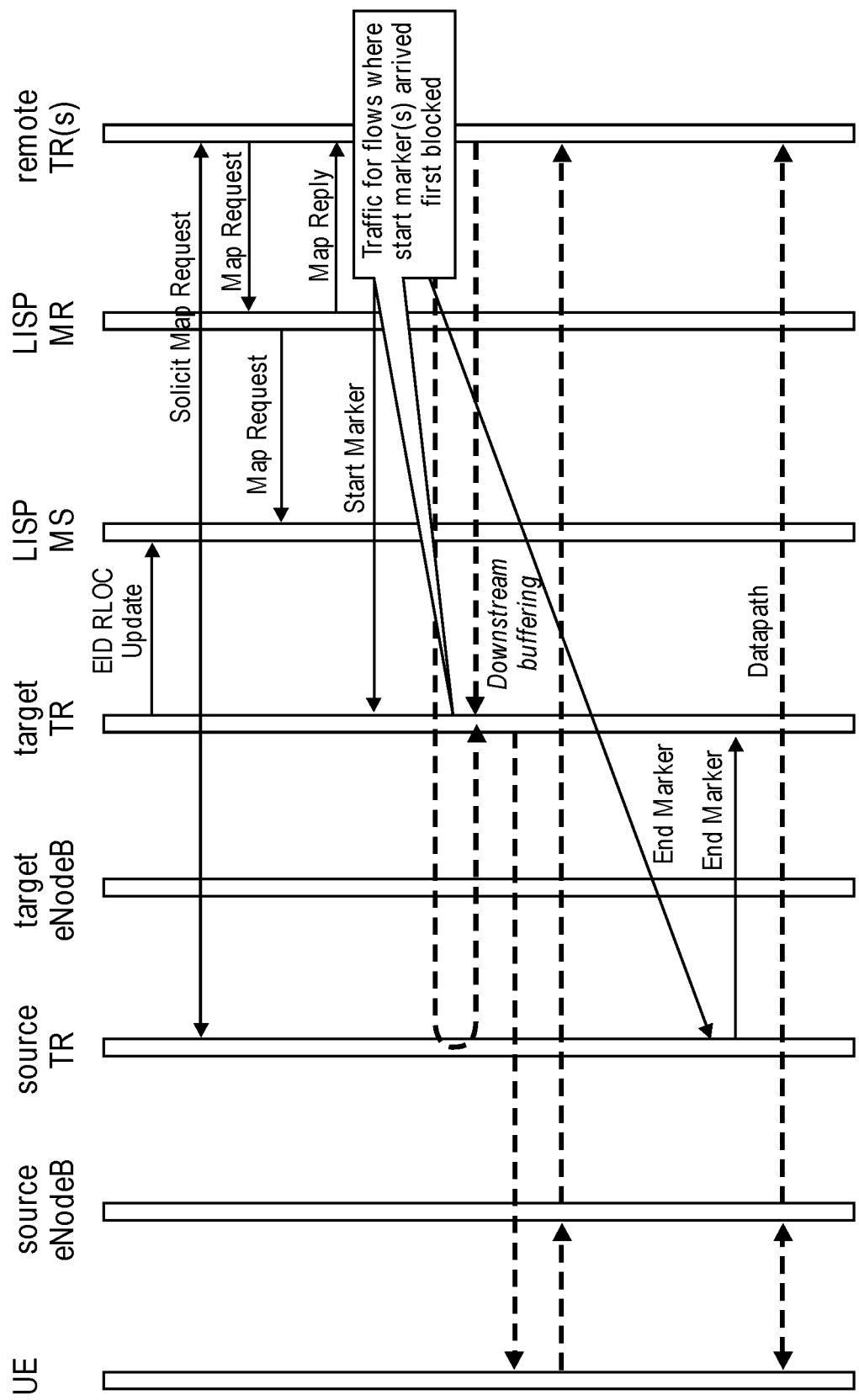
FIG. 18 is a further diagram of one embodiment of the process for handover using markers.

FIGS. 17 and 18 form a diagram of one embodiment of the process for handover using markers. This is comparable to the call flow diagram of FIGS. 10 and 11 and illustrates the modification where start and end markers are sent by the remote TRs subsequent to the map reply causing blocking of traffic flows associated with the start markers by the target egress TR. Similarly, the source egress TR receives and redirects the end markers received from the remote TRs.

Different quality of service class identifiers (QCIs) associated with the traffic manifest themselves as different DSCPs. Different DSCPs manifest themselves as different latencies transiting the network. To address this an ingress TR would need to maintain a bloom filter per DSCP observed during the "traffic observation window" and issue a start and end marker transaction for each DSCP observed. The egress TR only needs to maintain a single EID bloom filter and not a bloom filter per DSCP as differences in queuing delays between DSCPs will be accounted for in the sequence of filter operations performed at the egress TR as start and end markers are processed. The egress TRs will not manage the traffic with relation to the QCI, rather the egress target TR will make decisions on whether or not to block traffic from other than the source egress TR for the EID.

The use of bloom filters to track the markers improves the LISP based mobility architecture and in combination provides benefits and advantages over the art. Bloom filters offer a very compact encoding of correspondent information, with comparatively simple processing at the target egress TR. AND/OR operations can be used to keep the bitmap up to date. Bloom filters potentially generate "false positives" but not "false negatives" therefore there is a chance traffic will be blocked that should not be, but traffic that should be blocked would always be blocked. The only time this would not be true is potential race conditions when there are collisions between start marker bloom filters from multiple ingress TRs.

Other considerations about the use of the bloom filters for marker tracking include that both end markers need to carry the ingress TR RLOC in the protocol data unit (PDU). An end marker when relayed by the source egress TR will otherwise not be able to identify the original ingress TR. In some embodiments, the start marker may also include the ingress TR RLOC. A source egress TR cannot use end marker transactions as a reliable indication as to when to retire state. The source egress TR has no idea how many it will receive and it is not reliable. Thus, the state associated with the redirecting of traffic for an EID to a target egress TR will be required to simply age out. A target TR can use an empty bloom filter as a cue to simply pass traffic for that EID without any extra processing. In some embodiments, there is no state reclamation upon completion of handover, instead there is a reversion to a "zeroed bloom filter" behavior, but in other embodiments this may be aged out as well.

These embodiments may utilize a few changes to how LISP nodes work. Specifically, a pair of egress TRs can share information on a pending handover as discussed above. Other changes include that an egress TR can have 5 states for an EID: don't know it (silent discard of traffic); unavailable (know it and will queue traffic); available (know it and can forward traffic to it); redirect source (forward traffic for an EID to another egress TR); and redirect target (receive traffic from another egress TR and ingress TRs with the queuing disciplines described herein above).

The bloom filter process can be applied to the various handover scenarios including the visited network scenario, which would see potential traffic from a remote P-GW that was GTP-U encapsulated as well as local IP traffic (i.e., Selected IP Traffic Offload (SIPTO)), which means what is hashed by the TR to produce a bloom filter would vary, but the basic technique still works.

Additional advantages of the bloom filter embodiments, include the combination of start and end markers that ensure that minimal unnecessary blocking occurs at the granularity of a flow such that it works with a distributed set of senders. If an end marker for the hash of a given flow arrives before the start marker, no blocking is performed. If a new flow is initiated after the start marker is sent, then there is a high probability of the flow not being unnecessarily blocked. The combination of start and end markers that carry bloom filters permits individual flows to be selectively unblocked when the differential delay between the paths indicates a possibility of misordering. The technique of sending a flow map on both paths accounts for all combinations of latency differences between the set of ingress TRs and both the source and target egress TRs. The technique is conservative in that it will generate false positives but not false negatives.

A further embodiment provides an improved method of EID mapping for the handoff/handover process. When a mobility event occurs, the target TR may not have LISP mappings for the correspondents of the UE being handed off. If so, there will be latency introduced in the upstream path if the target TR needs to resolve all correspondent/RLOC mappings after the handoff occurs. Therefore, the embodiments provide a means of ensuring the target TR has the necessary correspondent/RLOC mappings at the time the UE attaches to the target TR. The embodiments provide a robust solution, especially in the scenario where the correspondent(s) are simultaneously being handed off between RLOCs, and/or the target TR has a priori knowledge of the EID.

The embodiments provide solutions for many scenarios including two key scenarios of interest when a simultaneous handoff is occurring. In the first scenario, the target TR had no prior knowledge of the correspondent EID/RLOC mapping. In the second scenario, the target TR did have prior knowledge of the correspondent EID/RLOC mapping.

In the scenario where the target TR has no prior knowledge of the EID/RLOC mapping, the process handles this by making use of the fact that the correspondent handover occurred in a way that is visible to both the source and the target TR. The source TR includes the current correspondent EID/RLOC mappings in an EID handover request. This avoids all race conditions at the source TR. For example, the source TR may have received a solicit map request, issued a map request, but not yet received a response. The consequence of this is the handoff will be visible to the target TR as the correspondent EID/RLOC received from the source TR will differ from that received from the mapping system.

In the case where the target TR already has knowledge of the correspondent EID, this is a complicated scenario because the correspondent handoff visibility to both the source and target TR will be unsynchronized. For example, a target TR may have received a solicit map request and performed a successful map update, while at the same time receiving stale information in the EID handover request. There may also be multiple UEs handing off to the same target TR simultaneously AND the UEs have common correspondents. Also, the target TR receives multiple EID handoff requests with colliding EID/RLOC information.

The embodiments provide a process with the following advantages. The TR keeps track of which correspondent EID/RLOC mappings that are associated with a local EID. When a handoff occurs between a source TR and target TR as described in the embodiments herein above, the EID handover request issued by the source TR to the target TR also contains current information about the correspondent/RLOC mappings for the handed off EID (mapping and map version information). If the target TR has no current mapping for any EID in the EID handover message, it will install the new mapping, and will issue a map-request to the LISP mapping system to ensure the mappings are up to date. If the target TR implements the LISP handover procedures, it may initiate a traffic observation window. If the target TR already has an RLOC mapping for the EID, the target TR will use the map version information to determine if the EID/RLOC mapping in the handover request is fresher. If so, it may either initiate "traffic observation" procedures thereby preserving downstream flow ordering during LISP handoff and thus deferring installing the new mapping until the associated EID attaches to the target TR, or may install the new EID RLOC mapping immediately. If the map response above differs from the information received in the EID handover request, the target TR may perform the handover procedures using the bloom filters described above, as part of the head end switch.

The embodiments address where there is a conflict between RLOC information received from the source TR and already available at the target TR that some UE flows are going to be problematic. Both the source and target TRs had a correspondent for the UE that is also handing off. The result is that all UEs homed on the target TR that are communicating with the corresponding EID that is also handing off will be brought to a common state. If the target TR had already head end switched to the new remote EID/RLOC, then the UE handing off from the source TR will be brought into line and the target TR will not be able to use "ordered delivery" procedures.

If the target TR had not head end switched and the EID/RLOC information in the EID handover request message proved to be fresher, then the UEs already homed on the target TR and communicating with the correspondents will need to initiate the head end switch to bring all into alignment. These issues can be mitigated by the embodiments. "Ordered delivery" procedures could be augmented to mitigate some of the effects of a switch when the traffic of multiple UEs to a correspondent needs to be brought in line with a current RLOC mapping. The key requirement would be a traffic observation window to generate the necessary bloom filters.

When an EID Handover Request is received by the target TR where an EID/RLOC mapping to a correspondent proves fresher than the current EID/RLOC mapping at the target TR, it is assumed that the correspondent is also changing location. Therefore this commences traffic observation for flows to the correspondent and defers installing the new EID/RLOC mapping until the target TR sees an "EID Available" message, at which time the target TR terminates the observation window and sends the start and end marker messages as per "ordered delivery" procedures.

The embodiments of the improved EID mapping utilize a set of states managed by a state machine at the respective TR. The states include, Start—Where there is no information for a given EID, Map request no RLOC—where there is requested information for an EID, but the TR does not have a current EID/RLOC mapping, Map request RLOC—the TR has requested information for an EID, and already has an existing EID/RLOC mapping, and Registered RLOC—the TR has an RLOC for the EID, no outstanding requests for information, and the LISP mapping system knows that the TR is interested in the EID.

Figure 19:
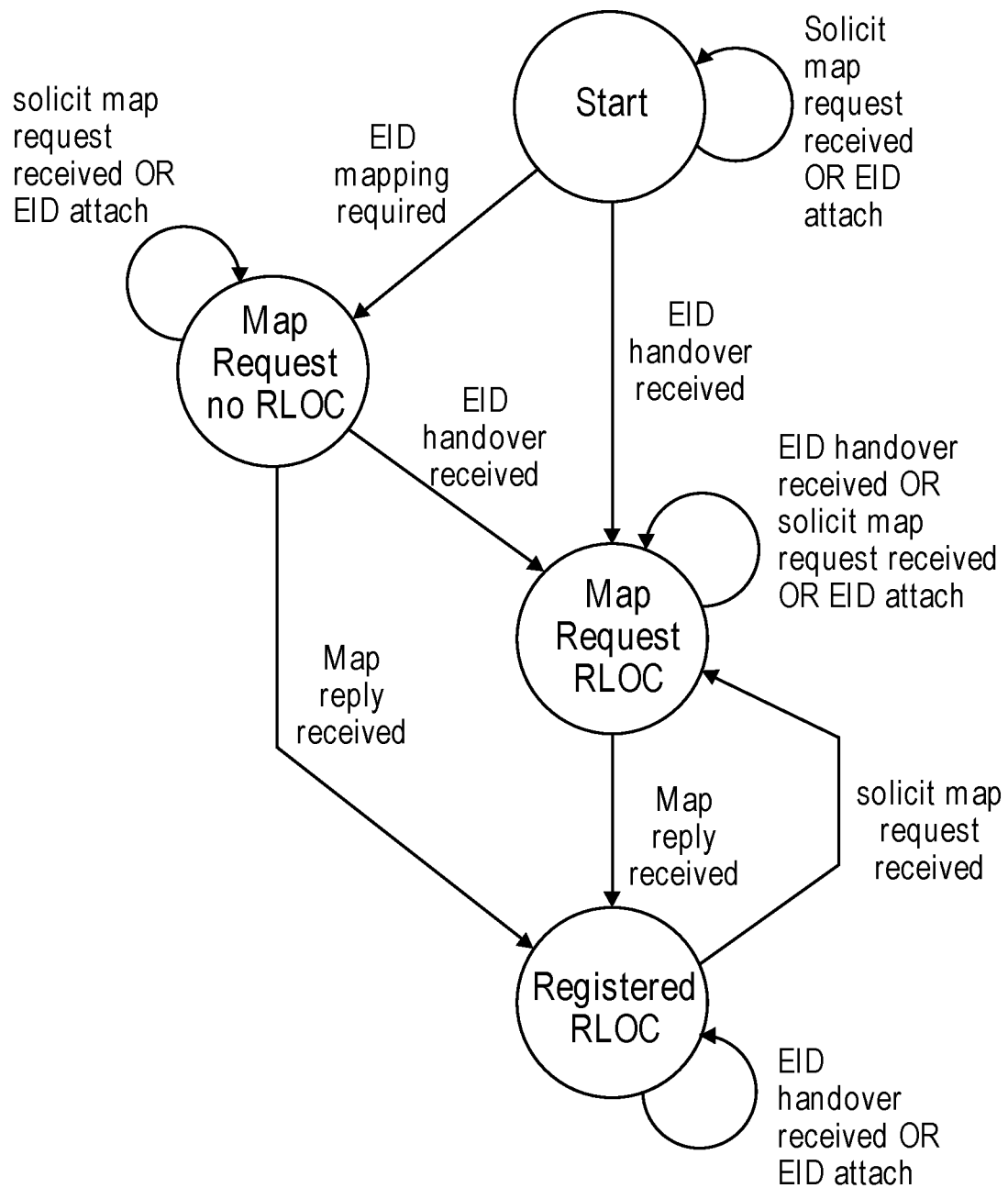
FIG. 19 is a flowchart of one embodiment of a process for handling state of a source TR during a handover.

FIG. 19 is a flowchart of one embodiment of a process for handling state of a source TR during a handover. The TRs manage the mapping of EID/RLOCs using a generalized state machine. The state machine is designed in order to facilitate the incorporation of traffic observation windows in the case of a simultaneous handoff of a correspondent as well as the UE of interest. If flow ordering is not employed map versioning is exclusively used as an arbitrator between the LISP system, local mappings and mappings received from peers in handoff messages. The state machine is a type of process that starts in a "Start" state. In reaction to a solicit map request received or EID attach, the state remains the same. In response to an EID mapping required the state shifts to a Map Request no RLOC state. In response to an EID handover received, the process shifts to a Map request RLOC state.

In the Map Request no RLOC state, the process stays in this state in response to the solicit map request received or the EID attach. The process changes to a MAP request RLOC state in response to an EID handover received. The process changes the state to Registered RLOC in response to a map reply received.

In the map request RLOC state, the process remains in this state in response to an EID handover received or solicit map request received or EID attach. In response to a map reply received, the process changes to a Registered RLOC state. In the Registered RLOC state, the process changes to the MAP Request RLOC state when a solicit map request is received. In all other cases, it remains in this state.

The process does not issue new map requests if there is already one outstanding. The last RLOC is only updated when a new current RLOC is different from the last current RLOC (it is possible to have multiple handoffs occurring simultaneously implying redundant information). Solicit map requests may be received when there is an outstanding map request and are ignored. It may be assumed that there will not be race conditions of 3 RLOCs for an EID.

Table II is an example of a state table maintained by a source node (e.g., source TR).

TABLE II

| State | Trigger | Next State | Action |
|---|---|---|---|
| Start | EID handover | Map Request RLOC | Current RLOC = EID handover RLOC, map request sent |
| Start | Mapping required | Map request no RLOC | Current RLOC = none Map request sent |
| Start | Solicit map request received OR EID attach | Start | No action |
| Map request no RLOC | Map reply received | Registered RLOC | Current RLOC = map reply Last RLOC = none |
| Map request no RLOC | EID handover | Map request RLOC | Install EID RLOC mapping from handover request |
| Map request no RLOC | Solicit map request received or EID attach | Map request no RLOC | No action |
| Map request RLOC | EID Handover or Solicit map request received or EID attach | Map request RLOC | For every EID RLOC mapping in the EID handover that is fresher than a current EID RLOC mapping update the local EID RLOC |
| Map request RLOC | Map reply received | Registered RLOC | Current RLOC = map reply |
| Registered RLOC | EID handover or EID attach | Registered RLOC | For every EID RLOC mapping in the EID handover that is fresher than a current EID RLOC mapping update the local EID RLOC |
| Registered RLOC | Solicit map request received | Map request RLOC | Map request sent. |

Table III is an example of a state table at a source node (e.g., source TR) that is further augmented to implement traffic observation window procedures.

TABLE III

| State | Trigger | Next State | Action |
|---|---|---|---|
| Start | EID handover | Map Request RLOC | Current RLOC = EID handover RLOC, map request sent |
| Start | Mapping required | Map request no RLOC | Current RLOC = none Map request sent |
| Start | Solicit map request received OR EID attach | Start | No action |
| Map request no RLOC | Map reply received | Registered RLOC | Current RLOC = map reply Last RLOC = none |
| Map request no RLOC | EID handover | Map request RLOC | Install EID RLOC mapping from handover request, initiate traffic observation |
| Map request no RLOC | Solicit map request received or EID attach | Map request no RLOC | No action |
| Map request RLOC | EID Handover or solicit map request received | Map request RLOC | For every EID RLOC mapping in the EID handover that is fresher than a current EID RLOC mapping and not already being observed, initiate traffic observation for flows sent to that EID and queue the EID RLOC mapping for future install |
| Map Request RLOC | EID attach | Registered RLOC | For any correspondent associated with the EID for which we have a deferred update, update the EID RLOC binding and issue the start and end marker transactions, else ignore |
| Map request RLOC | Map reply received | Registered RLOC | If EID RLOC received is fresher than current update the EID RLOC binding and issue the start and end marker transactions, else ignore. Terminate traffic observation. |
| Registered RLOC | EID handover | Map request RLOC | For every EID RLOC mapping in the EID handover that is fresher than a current EID RLOC mapping initiate traffic observation for flows sent to that EID and queue the EID RLOC mapping for future install |

TABLE III-continued

| State | Trigger | Next State | Action |
| --- | --- | --- | --- |
| Registered RLOC | Solicit map request received | Map request RLOC | Map request sent. Initiate traffic observation |
| Registered RLOC | EID attach | Registered RLOC | For any correspondent associated with the EID with a deferred EID RLOC update, update the EID RLOC binding and issue the start and end marker transactions, else ignore |

The embodiments provide advantages over the art including that correspondent mapping information in the "EID handover request" message eliminates latency in the upstream path during a handover as the necessary extra state is shared at the same time the handover is initiated. The process also provides advantages by including utilizing the map versioning information to permit the most recent mapping to be selected in scenarios where there are differences of EID RLOC bindings between the source and target nodes and to eliminate any redundant head end switches. In combination with the bloom filter processing for ordered packet processing, when an "EID handover request" will force a head end switch for existing correspondents, delaying the head end switch until the UE locally being handed over (that had already been using the fresher RLOC) as a trigger to initiate an observation window for "ordered handoff" procedures, and the actual UE attachment as the head end switch trigger.

Figure 20A:
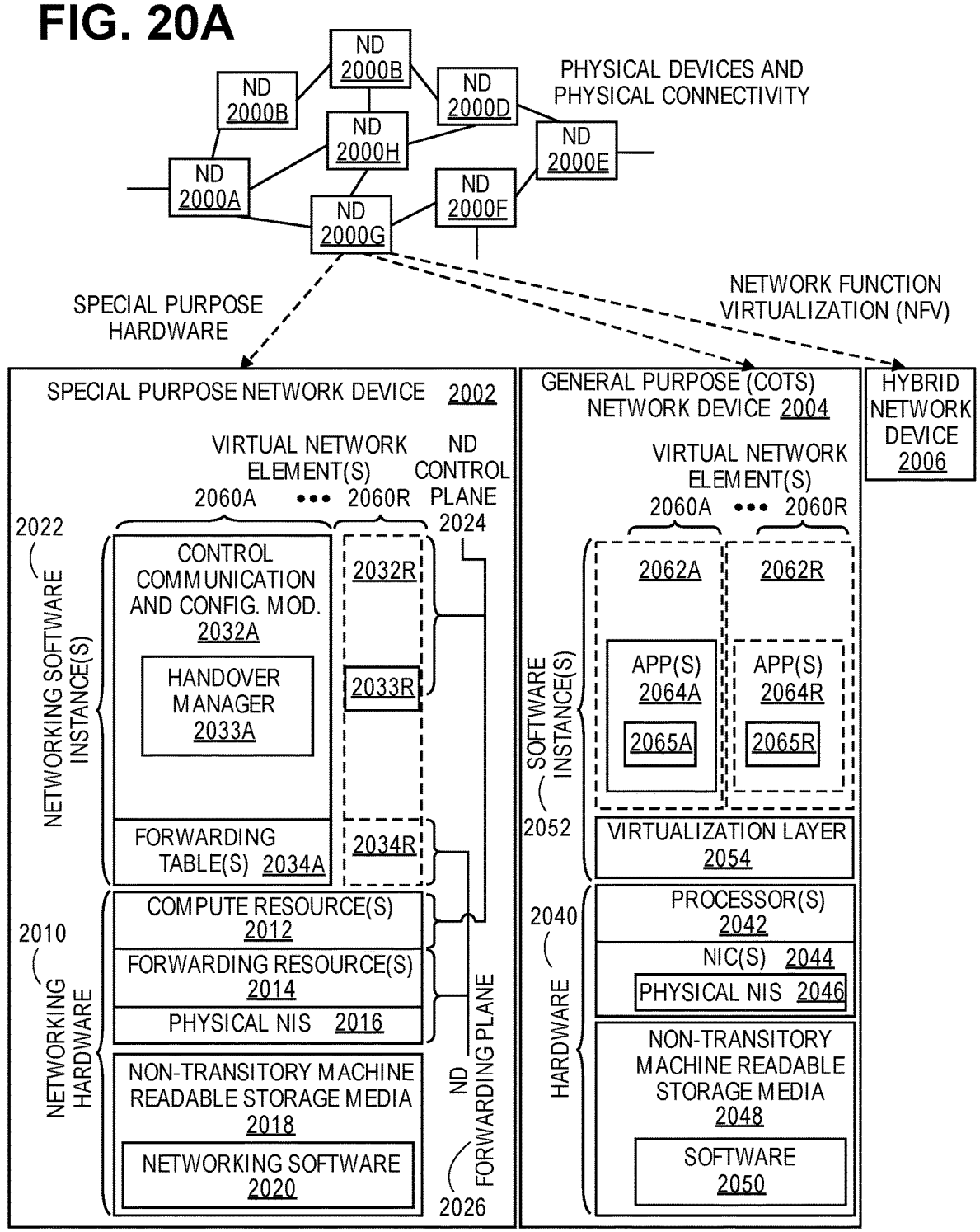
FIG. 20A illustrates connectivity between network devices (NDs) within an exemplary network, as well as three exemplary implementations of the NDs, according to some embodiments of the invention.

FIG. 20A illustrates connectivity between network devices (NDs) within an exemplary network, as well as three exemplary implementations of the NDs, according to some embodiments of the invention. FIG. 20A shows NDs 2000A-H, and their connectivity by way of lines between 2000A-2000B, 2000B-2000C, 2000C-2000D, 2000D-2000E, 2000E-2000F, 2000F-2000G, and 2000A-2000G, as well as between 2000H and each of 2000A, 2000C, 2000D, and 2000G. These NDs are physical devices, and the connectivity between these NDs can be wireless or wired (often referred to as a link). An additional line extending from NDs 2000A, 2000E, and 2000F illustrates that these NDs act as ingress and egress points for the network (and thus, these NDs are sometimes referred to as edge NDs; while the other NDs may be called core NDs).

Two of the exemplary ND implementations in FIG. 20A are: 1) a special-purpose network device 2002 that uses custom application-specific integrated-circuits (ASICs) and a special-purpose operating system (OS); and 2) a general purpose network device 2004 that uses common off-the-shelf (COTS) processors and a standard OS.

The special-purpose network device 2002 includes networking hardware 2010 comprising compute resource(s) 2012 (which typically include a set of one or more processors), forwarding resource(s) 2014 (which typically include one or more ASICs and/or network processors), and physical network interfaces (NIs) 2016 (sometimes called physical ports), as well as non-transitory machine readable storage media 2018 having stored therein networking software 2020. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 2000A-H. During operation, the networking software 2020 may be executed by the networking hardware 2010 to instantiate a set of one or more networking software instance(s) 2022. Each of the networking software instance(s) 2022, and that part of the networking hardware 2010 that executes that network software instance (be it hardware dedicated to that networking software instance and/or time slices of hardware temporally shared by that networking software instance with others of the networking software instance(s) 2022), form a separate virtual network element 2030A-R. Each of the virtual network element(s) (VNEs) 2030A-R includes a control communication and configuration module 2032A-R (sometimes referred to as a local control module or control communication module) and forwarding table(s) 2034A-R, such that a given virtual network element (e.g., 2030A) includes the control communication and configuration module (e.g., 2032A), a set of one or more forwarding table(s) (e.g., 2034A), and that portion of the networking hardware 2010 that executes the virtual network element (e.g., 2030A).

The special-purpose network device 2002 is often physically and/or logically considered to include: 1) a ND control plane 2024 (sometimes referred to as a control plane) comprising the compute resource(s) 2012 that execute the control communication and configuration module(s) 2032A-R; and 2) a ND forwarding plane 2026 (sometimes referred to as a forwarding plane, a data plane, or a media plane) comprising the forwarding resource(s) 2014 that utilize the forwarding table(s) 2034A-R and the physical NIs 2016. By way of example, where the ND is a router (or is implementing routing functionality), the ND control plane 2024 (the compute resource(s) 2012 executing the control communication and configuration module(s) 2032A-R) is typically responsible for participating in controlling how data (e.g., packets) is to be routed (e.g., the next hop for the data and the outgoing physical NI for that data) and storing that routing information in the forwarding table(s) 2034A-R, and the ND forwarding plane 2026 is responsible for receiving that data on the physical NIs 2016 and forwarding that data out the appropriate ones of the physical NIs 2016 based on the forwarding table(s) 2034A-R.

Figure 20B:
FIG. 20B illustrates an exemplary way to implement a special-purpose network device according to some embodiments of the invention.

FIG. 20B illustrates an exemplary way to implement the special-purpose network device 2002 according to some embodiments of the invention. FIG. 20B shows a special-purpose network device including cards 2038 (typically hot pluggable). While in some embodiments the cards 2038 are of two types (one or more that operate as the ND forwarding plane 2026 (sometimes called line cards), and one or more that operate to implement the ND control plane 2024 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 2036 (e.g., a first full mesh coupling the line cards and a second full mesh coupling all of the cards).

Returning to FIG. 20A, the general purpose network device 2004 includes hardware 2040 comprising a set of one or more processor(s) 2042 (which are often COTS processors) and network interface controller(s) 2044 (NICs; also known as network interface cards) (which include physical NIs 2046), as well as non-transitory machine readable storage media 2048 having stored therein software 2050. During operation, the processor(s) 2042 execute the software 2050 to instantiate one or more sets of one or more applications 2064A-R. While one embodiment does not implement virtualization, alternative embodiments may use different forms of virtualization. For example, in one such alternative embodiment the virtualization layer 2054 represents the kernel of an operating system (or a shim executing on a base operating system) that allows for the creation of multiple instances 2062A-R called software containers that may each be used to execute one (or more) of the sets of applications 2064A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 2054 represents a hypervisor (sometimes referred to as a virtual machine monitor (VMM)) or a hypervisor executing on top of a host operating system, and each of the sets of applications 2064A-R is run on top of a guest operating system within an instance 2062A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 2040, directly on a hypervisor (in which case the unikernel is sometimes described as running within a LibOS virtual machine), or in a software container, embodiments can be implemented fully with unikernels running directly on a hypervisor represented by virtualization layer 2054, unikernels running within software containers represented by instances 2062A-R, or as a combination of unikernels and the above-described techniques (e.g., unikernels and virtual machines both run directly on a hypervisor, unikernels and sets of applications that are run in different software containers).

The instantiation of the one or more sets of one or more applications 2064A-R, as well as virtualization if implemented, are collectively referred to as software instance(s) 2052. Each set of applications 2064A-R, corresponding virtualization construct (e.g., instance 2062A-R) if implemented, and that part of the hardware 2040 that executes them (be it hardware dedicated to that execution and/or time slices of hardware temporally shared), forms a separate virtual network element(s) 2060A-R. The applications 2064A-R may include a handover manager 2065 A-R that may encompass the components of a distributed data plane serving gateway (S-GWu), distributed data plane packet-gateway (P-GWu), tunnel routers and similar components and processes as described herein, in particular to the processes describe with reference to FIGS. 12-15.

The virtual network element(s) 2060A-R perform similar functionality to the virtual network element(s) 2030A-R—e.g., similar to the control communication and configuration module(s) 2032A and forwarding table(s) 2034A (this virtualization of the hardware 2040 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 2062A-R corresponding to one VNE 2060A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 2062A-R to VNEs also apply to embodiments where such a finer level of granularity and/or unikernels are used.

In certain embodiments, the virtualization layer 2054 includes a virtual switch that provides similar forwarding services as a physical Ethernet switch. Specifically, this virtual switch forwards traffic between instances 2062A-R and the NIC(s) 2044, as well as optionally between the instances 2062A-R; in addition, this virtual switch may enforce network isolation between the VNEs 2060A-R that by policy are not permitted to communicate with each other (e.g., by honoring virtual local area networks (VLANs)).

The third exemplary ND implementation in FIG. 20A is a hybrid network device 2006, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 2002) could provide for para-virtualization to the networking hardware present in the hybrid network device 2006.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 2030A-R, VNEs 2060A-R, and those in the hybrid network device 2006) receives data on the physical NIs (e.g., 2016, 2046) and forwards that data out the appropriate ones of the physical NIs (e.g., 2016, 2046). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 20C:
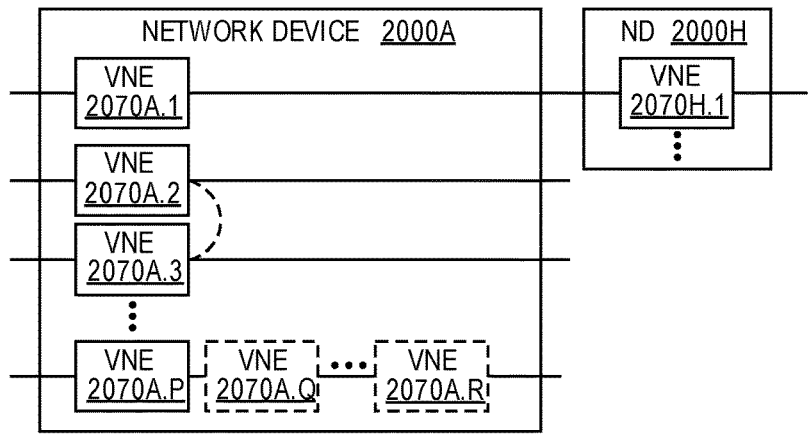
FIG. 20C illustrates various exemplary ways in which virtual network elements (VNEs) may be coupled according to some embodiments of the invention.

FIG. 20C illustrates various exemplary ways in which VNEs may be coupled according to some embodiments of the invention. FIG. 20C shows VNEs 2070A.1-2070A.P (and optionally VNEs 2070A.Q-2070A.R) implemented in ND 2000A and VNE 2070H.1 in ND 2000H. In FIG. 20C, VNEs 2070A.1-P are separate from each other in the sense that they can receive packets from outside ND 2000A and forward packets outside of ND 2000A; VNE 2070A.1 is coupled with VNE 2070H.1, and thus they communicate packets between their respective NDs; VNE 2070A.2-2070A.3 may optionally forward packets between themselves without forwarding them outside of the ND 2000A; and VNE 2070A.P may optionally be the first in a chain of VNEs that includes VNE 2070A.Q followed by VNE 2070A.R (this is sometimes referred to as dynamic service chaining, where each of the VNEs in the series of VNEs provides a different service—e.g., one or more layer 4-7 network services). While FIG. 20C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 20A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 20A may also host one or more such servers (e.g., in the case of the general purpose network device 2004, one or more of the software instances 2062A-R may operate as servers; the same would be true for the hybrid network device 2006; in the case of the special-purpose network device 2002, one or more such servers could also be run on a virtualization layer executed by the compute resource(s) 2012); in which case the servers are said to be co-located with the VNEs of that ND.

A virtual network is a logical abstraction of a physical network (such as that in FIG. 20A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 20D:
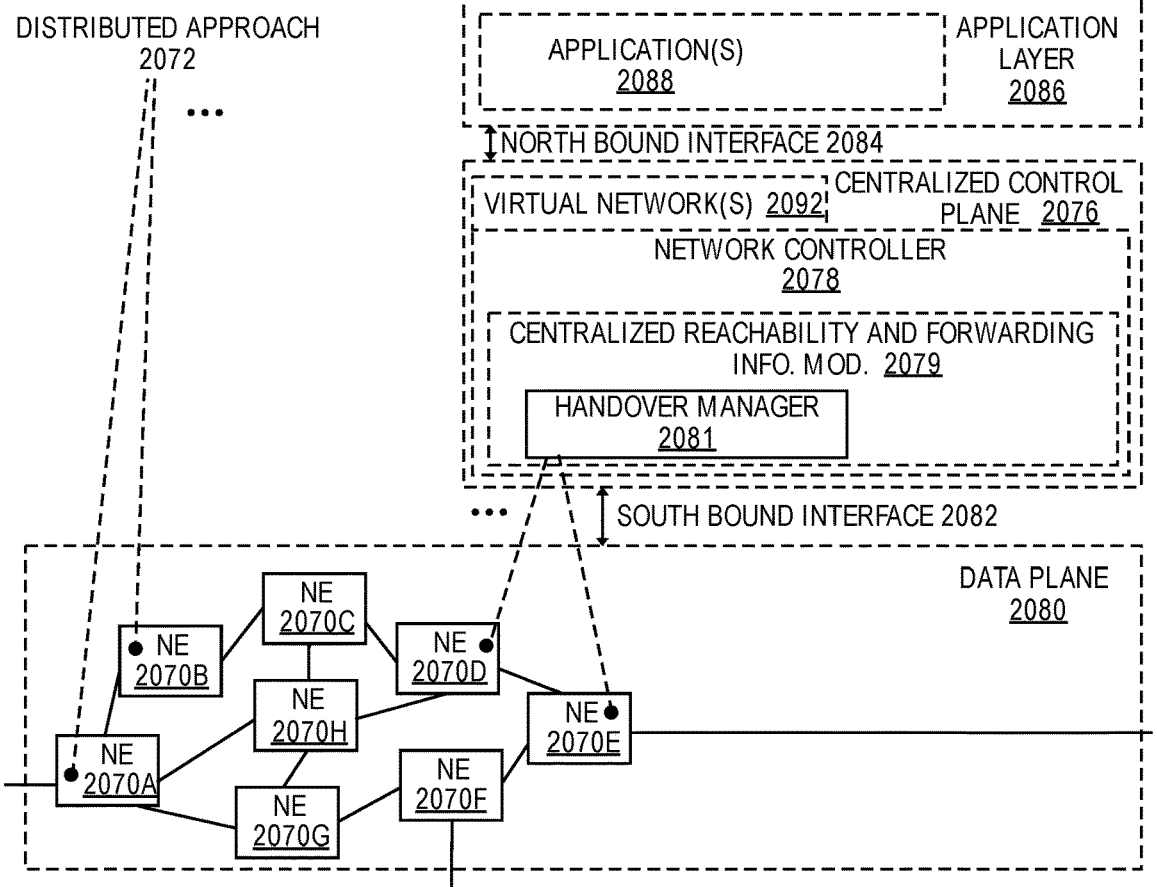
FIG. 20D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 20D illustrates a network with a single network element on each of the NDs of FIG. 20A, and within this straight forward approach contrasts a traditional distributed approach (commonly used by traditional routers) with a centralized approach for maintaining reachability and forwarding information (also called network control), according to some embodiments of the invention. Specifically, FIG. 20D illustrates network elements (NEs) 2070A-H with the same connectivity as the NDs 2000A-H of FIG. 20A.

FIG. 20D illustrates that the distributed approach 2072 distributes responsibility for generating the reachability and forwarding information across the NEs 2070A-H; in other words, the process of neighbor discovery and topology discovery is distributed.

For example, where the special-purpose network device 2002 is used, the control communication and configuration module(s) 2032A-R of the ND control plane 2024 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 2070A-H (e.g., the compute resource(s) 2012 executing the control communication and configuration module(s) 2032A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 2024. The ND control plane 2024 programs the ND forwarding plane 2026 with information (e.g., adjacency and route information) based on the routing structure(s). For example, the ND control plane 2024 programs the adjacency and route information into one or more forwarding table(s) 2034A-R (e.g., Forwarding Information Base (FIB), Label Forwarding Information Base (LFIB), and one or more adjacency structures) on the ND forwarding plane 2026. For layer 2 forwarding, the ND can store one or more bridging tables that are used to forward data based on the layer 2 information in that data. While the above example uses the special-purpose network device 2002, the same distributed approach 2072 can be implemented on the general purpose network device 2004 and the hybrid network device 2006.

FIG. 20D illustrates that a centralized approach 2074 (also known as software defined networking (SDN)) that decouples the system that makes decisions about where traffic is sent from the underlying systems that forwards traffic to the selected destination. The illustrated centralized approach 2074 has the responsibility for the generation of reachability and forwarding information in a centralized control plane 2076 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 2076 has a south bound interface 2082 with a data plane 2080 (sometime referred to the infrastructure layer, network forwarding plane, or forwarding plane (which should not be confused with a ND forwarding plane)) that includes the NEs 2070A-H (sometimes referred to as switches, forwarding elements, data plane elements, or nodes). The centralized control plane 2076 includes a network controller 2078, which includes a centralized reachability and forwarding information module 2079 that determines the reachability within the network and distributes the forwarding information to the NEs 2070A-H of the data plane 2080 over the south bound interface 2082 (which may use the OpenFlow protocol). Thus, the network intelligence is centralized in the centralized control plane 2076 executing on electronic devices that are typically separate from the NDs.

For example, where the special-purpose network device 2002 is used in the data plane 2080, each of the control communication and configuration module(s) 2032A-R of the ND control plane 2024 typically include a control agent that provides the VNE side of the south bound interface 2082. In this case, the ND control plane 2024 (the compute resource(s) 2012 executing the control communication and configuration module(s) 2032A-R) performs its responsibility for participating in controlling how data (e.g., packets) is to be routed (e.g., the next hop for the data and the outgoing physical NI for that data) through the control agent communicating with the centralized control plane 2076 to receive the forwarding information (and in some cases, the reachability information) from the centralized reachability and forwarding information module 2079 (it should be understood that in some embodiments of the invention, the control communication and configuration module(s) 2032A-R, in addition to communicating with the centralized control plane 2076, may also play some role in determining reachability and/or calculating forwarding information—albeit less so than in the case of a distributed approach; such embodiments are generally considered to fall under the centralized approach 2074, but may also be considered a hybrid approach). The control communication and configuration module 932A-R may implement a handover manager 2033A-R that may encompass the components of a distributed data plane serving gateway (S-GWu), distributed data plane packet-gateway (P-GWu), tunnel routers and similar components and processes as described herein, in particular to the processes describe with reference to FIGS. 12-15.

While the above example uses the special-purpose network device 2002, the same centralized approach 2074 can be implemented with the general purpose network device 2004 (e.g., each of the VNE 2060A-R performs its responsibility for controlling how data (e.g., packets) is to be routed (e.g., the next hop for the data and the outgoing physical NI for that data) by communicating with the centralized control plane 2076 to receive the forwarding information (and in some cases, the reachability information) from the centralized reachability and forwarding information module 2079; it should be understood that in some embodiments of the invention, the VNEs 2060A-R, in addition to communicating with the centralized control plane 2076, may also play some role in determining reachability and/or calculating forwarding information—albeit less so than in the case of a distributed approach) and the hybrid network device 2006. In fact, the use of SDN techniques can enhance the NFV techniques typically used in the general purpose network device 2004 or hybrid network device 2006 implementations as NFV is able to support SDN by providing an infrastructure upon which the SDN software can be run, and NFV and SDN both aim to make use of commodity server hardware and physical switches.

FIG. 20D also shows that the centralized control plane 2076 has a north bound interface 2084 to an application layer 2086, in which resides application(s) 2088. The centralized control plane 2076 has the ability to form virtual networks 2092 (sometimes referred to as a logical forwarding plane, network services, or overlay networks (with the NEs 2070A-H of the data plane 2080 being the underlay network)) for the application(s) 2088. Thus, the centralized control plane 2076 maintains a global view of all NDs and configured NEs/VNEs, and it maps the virtual networks to the underlying NDs efficiently (including maintaining these mappings as the physical network changes either through hardware (ND, link, or ND component) failure, addition, or removal). The control communication and configuration module 979 or applications 988 may implement a handover manager 2081 that may encompass the components of a distributed data plane serving gateway (S-GWu), distributed data plane packet-gateway (P-GWu), tunnel routers and similar components and processes as described herein, in particular to the processes describe with reference to FIGS. 12-15.

While FIG. 20D shows the distributed approach 2072 separate from the centralized approach 2074, the effort of network control may be distributed differently or the two combined in certain embodiments of the invention. For example: 1) embodiments may generally use the centralized approach (SDN) 2074, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 2074, but may also be considered a hybrid approach.

While FIG. 20D illustrates the simple case where each of the NDs 2000A-H implements a single NE 2070A-H, it should be understood that the network control approaches described with reference to FIG. 20D also work for networks where one or more of the NDs 2000A-H implement multiple VNEs (e.g., VNEs 2030A-R, VNEs 2060A-R, those in the hybrid network device 2006). Alternatively or in addition, the network controller 2078 may also emulate the implementation of multiple VNEs in a single ND. Specifically, instead of (or in addition to) implementing multiple VNEs in a single ND, the network controller 2078 may present the implementation of a VNE/NE in a single ND as multiple VNEs in the virtual networks 2092 (all in the same one of the virtual network(s) 2092, each in different ones of the virtual network(s) 2092, or some combination). For example, the network controller 2078 may cause an ND to implement a single VNE (a NE) in the underlay network, and then logically divide up the resources of that NE within the centralized control plane 2076 to present different VNEs in the virtual network(s) 2092 (where these different VNEs in the overlay networks are sharing the resources of the single VNE/NE implementation on the ND in the underlay network).

Figure 20E:
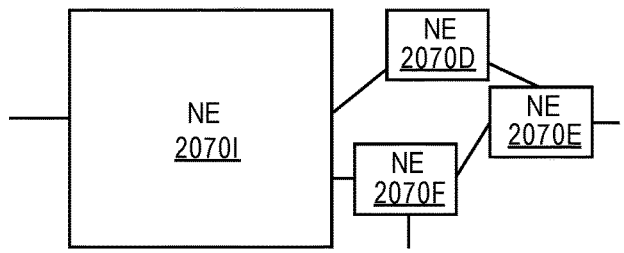
FIG. 20E illustrates the simple case of where each of the NDs implements a single NE, but a centralized control plane has abstracted multiple of the NEs in different NDs into (to represent) a single NE in one of the virtual network(s), according to some embodiments of the invention.
Figure 20F:
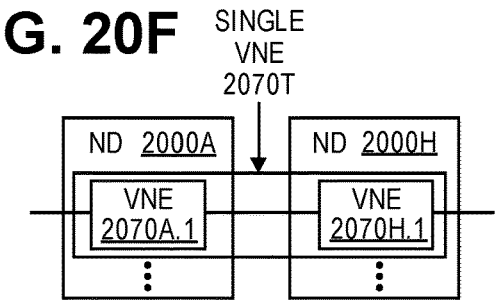
FIG. 20F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 20E and 20F respectively illustrate exemplary abstractions of NEs and VNEs that the network controller 2078 may present as part of different ones of the virtual networks 2092. FIG. 20E illustrates the simple case of where each of the NDs 2000A-H implements a single NE 2070A-H (see FIG. 20D), but the centralized control plane 2076 has abstracted multiple of the NEs in different NDs (the NEs 2070A-C and G-H) into (to represent) a single NE 20701 in one of the virtual network(s) 2092 of FIG. 20D, according to some embodiments of the invention. FIG. 20E shows that in this virtual network, the NE 20701 is coupled to NE 2070D and 2070F, which are both still coupled to NE 2070E.

FIG. 20F illustrates a case where multiple VNEs (VNE 2070A.1 and VNE 2070H.1) are implemented on different NDs (ND 2000A and ND 2000H) and are coupled to each other, and where the centralized control plane 2076 has abstracted these multiple VNEs such that they appear as a single VNE 2070T within one of the virtual networks 2092 of FIG. 20D, according to some embodiments of the invention. Thus, the abstraction of a NE or VNE can span multiple NDs.

While some embodiments of the invention implement the centralized control plane 2076 as a single entity (e.g., a single instance of software running on a single electronic device), alternative embodiments may spread the functionality across multiple entities for redundancy and/or scalability purposes (e.g., multiple instances of software running on different electronic devices).

Figure 21:
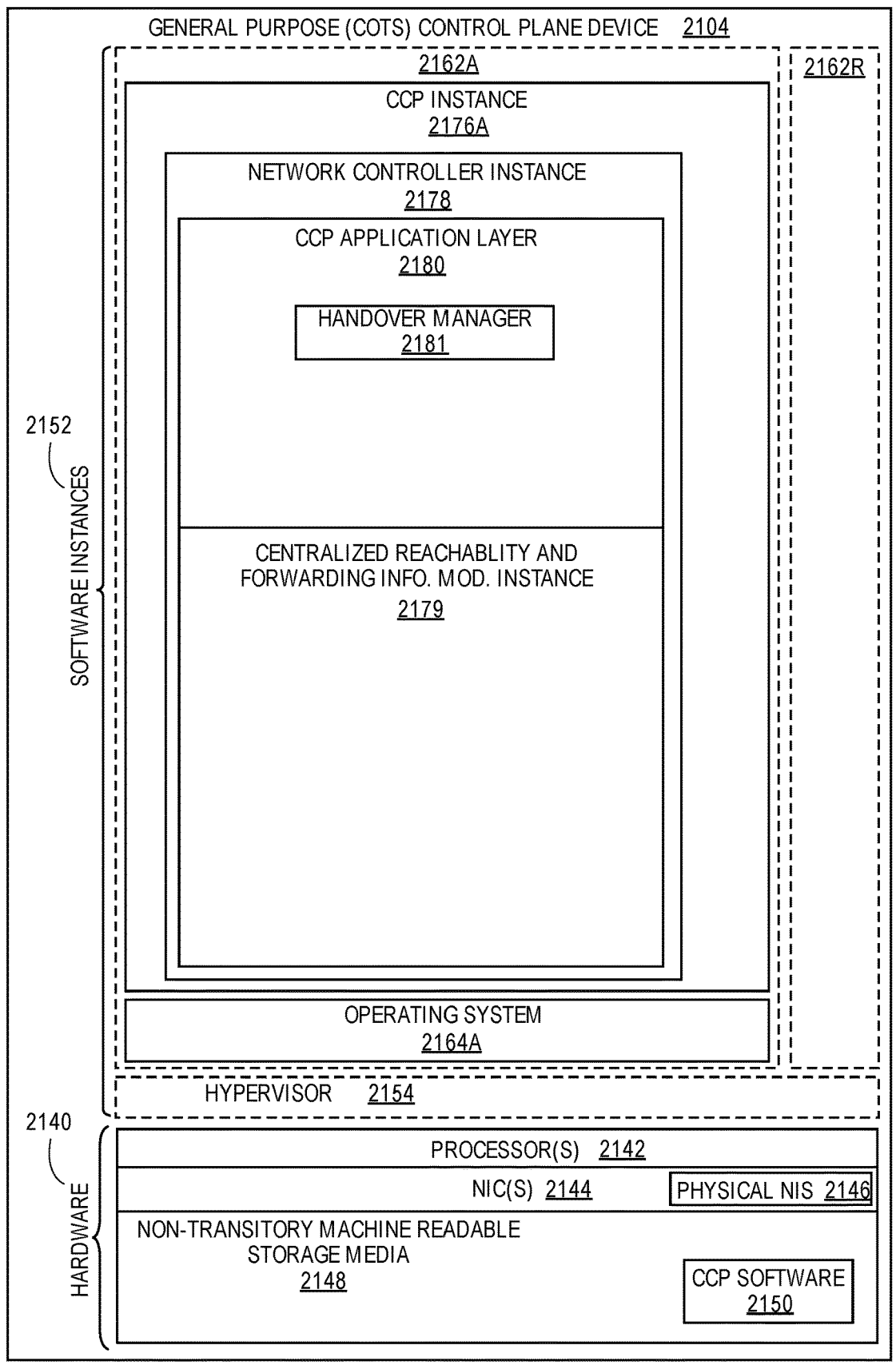
FIG. 21 illustrates a general purpose control plane device with centralized control plane (CCP) software, according to some embodiments of the invention.

Similar to the network device implementations, the electronic device(s) running the centralized control plane 2076, and thus the network controller 2078 including the centralized reachability and forwarding information module 2079, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 21 illustrates, a general purpose control plane device 2104 including hardware 2140 comprising a set of one or more processor(s) 2142 (which are often COTS processors) and network interface controller(s) 2144 (NICs; also known as network interface cards) (which include physical NIs 2146), as well as non-transitory machine readable storage media 2148 having stored therein centralized control plane (CCP) software 2150.

In embodiments that use compute virtualization, the processor(s) 2142 typically execute software to instantiate a virtualization layer 2154 (e.g., in one embodiment the virtualization layer 2154 represents the kernel of an operating system (or a shim executing on a base operating system) that allows for the creation of multiple instances 2162A-R called software containers (representing separate user spaces and also called virtualization engines, virtual private servers, or jails) that may each be used to execute a set of one or more applications; in another embodiment the virtualization layer 2154 represents a hypervisor (sometimes referred to as a virtual machine monitor (VMM)) or a hypervisor executing on top of a host operating system, and an application is run on top of a guest operating system within an instance 2162A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 2140, directly on a hypervisor represented by virtualization layer 2154 (in which case the unikernel is sometimes described as running within a LibOS virtual machine), or in a software container represented by one of instances 2162A-R). Again, in embodiments where compute virtualization is used, during operation an instance of the CCP software 2150 (illustrated as CCP instance 2176A) is executed (e.g., within the instance 2162A) on the virtualization layer 2154. In embodiments where compute virtualization is not used, the CCP instance 2176A is executed, as a unikernel or on top of a host operating system, on the "bare metal" general purpose control plane device 2104. The instantiation of the CCP instance 2176A, as well as the virtualization layer 2154 and instances 2162A-R if implemented, are collectively referred to as software instance(s) 2152.

In some embodiments, the CCP instance 2176A includes a network controller instance 2178. The network controller instance 2178 includes a centralized reachability and forwarding information module instance 2179 (which is a middleware layer providing the context of the network controller 2078 to the operating system and communicating with the various NEs), and an CCP application layer 2180 (sometimes referred to as an application layer) over the middleware layer (providing the intelligence required for various network operations such as protocols, network situational awareness, and user-interfaces). At a more abstract level, this CCP application layer 2180 within the centralized control plane 2076 works with virtual network view(s) (logical view(s) of the network) and the middleware layer provides the conversion from the virtual networks to the physical view. The CCP application layer 2180 may implement a handover manager 2081 that may encompass the components of a distributed data plane serving gateway (S-GWu), distributed data plane packet-gateway (P-GWu), tunnel routers and similar components and processes as described herein, in particular to the processes describe with reference to FIGS. 12-15.

The centralized control plane 2076 transmits relevant messages to the data plane 2080 based on CCP application layer 2180 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 2080 may receive different messages, and thus different forwarding information. The data plane 2080 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 2080, the packet (or a subset of the packet header and content) is typically forwarded to the centralized control plane 2076. The centralized control plane 2076 will then program forwarding table entries into the data plane 2080 to accommodate packets belonging to the flow of the unknown packet. Once a specific forwarding table entry has been programmed into the data plane 2080 by the centralized control plane 2076, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented by a network device in a cellular communication network, the method to improve handover processing by a source evolved universal terrestrial radio access network (E-UTRAN) node B (eNodeB) where the source eNodeB forwards traffic destined for a user equipment (UE) that is transferring its connection to a target eNodeB to enable mobility using a location identifier separation protocol (LISP) within the cellular communication network without anchor points, the method comprising:
 receiving an endpoint identifier (EID) handover request from the UE identifying the target eNodeB;
 sending a LISP EID handover message to the target eNodeB;
 determining the UE is unavailable to the source eNodeB after receiving a LISP acknowledgement for the LISP EID handover message from the target eNodeB;
 redirecting traffic for the UE to the target eNodeB,
 wherein the source eNodeB in the cellular communication network comprises a source tunnel router that facilitates communication, the method further comprising:
 sending a map request along with the identified target eNodeB to the LISP map resolver (MR); and
 receiving a map reply from the LISP MR, the map reply comprising a routing locator (RLOC) of a target tunnel router associated with the identified target eNodeB.

2. The method of claim 1, further comprising:
receiving an acknowledgement from the target eNodeB of the handover message.

3. The method of claim 1, further comprising:
receiving a solicit map request from a target tunnel router at the target eNodeB.

4. The method of claim 1, where the method is implemented by a source tunnel router and the source eNodeB includes a distributed serving gateway.

5. A method implemented by a network device in a cellular communication network, the method to improve handover processing by a target evolved universal terrestrial radio access network (E-UTRAN) node B (eNodeB) where the target eNodeB relays traffic between a user equipment (UE) and other devices connected to the cellular communication network to enable mobility using Location identifier separation protocol (LISP) within the cellular communication network without anchor points, the method comprising:
receiving an endpoint identifier (EID) handover message from a source eNodeB identifying the UE;
receiving and buffering redirected traffic for the UE from the source eNodeB;
detecting connection of the UE; and
sending the buffered traffic to the UE,
wherein the target eNodeB implements a distributed serving gateway and a target tunnel router facilitates communication, the method further comprising:
sending an endpoint identifier (EID) routing locator (RLOC) update to a location identifier separation protocol (LISP) mapping server (MS) to notify the LISP MS that the EID of the UE is now associated with that target TR.

6. The method of claim 5, further comprising:
sending an acknowledgement of the handover message to the source eNodeB.

7. The method of claim 5, further comprising:
notifying correspondent devices of the UE location.

8. The method of claim 7, further comprising:
receiving traffic for the UE from remote tunnel routers.

9. A network device in a cellular communication network to execute a method to improve handover processing by a source evolved universal terrestrial radio access network (E-UTRAN) node B (eNodeB) where the source eNodeB forwards traffic destined for a user equipment (UE) that is transferring its connection to a target eNodeB to enable mobility using a location identifier separation protocol (LISP) within the cellular communication network without anchor points, the network device comprising:
a non-transitory computer-readable storage medium having stored therein a handover manager; and
a processor coupled to the non-transitory computer-readable storage medium, the processor to execute the handover manager, the handover manager to receive an endpoint identifier (EID) handover request from the UE identifying the target eNodeB, to send a LISP EID handover message to the target eNodeB, to determine the UE is unavailable to the source eNodeB after receiving a LISP acknowledgement for the LISP EID handover message from the target eNodeB, and to redirect traffic for the UE to the target eNodeB, wherein a source tunnel router facilitates communication, the handover manager to send a map request to a location identifier separation protocol (LISP) mapping router (MR), and to receive a map reply from the LISP MR.

10. The network device of claim 9, wherein the handover manager to receive an acknowledgement from the target eNodeB of the handover message.

11. The network device of claim 9, wherein the handover manager to receive a solicit map request from a target tunnel router at the target eNodeB.

12. The network device of claim 9, where the network device implements a source tunnel router and the source eNodeB includes a distributed serving gateway.

13. A network device in a cellular communication network to execute a method to improve handover processing by a target evolved universal terrestrial radio access network (E-UTRAN) node B (eNodeB) where the target eNodeB relays traffic between a user equipment (UE) and other devices connected to the cellular communication network to enable mobility using Location identifier separation protocol (LISP) within the cellular communication network without anchor points, the network device comprising:
a non-transitory computer-readable medium having stored therein a handover manager; and
a processor coupled to the non-transitory computer readable medium, the processor to execute the handover manager, the handover manager to receive an endpoint identifier (EID) handover message from a source eNodeB identifying the UE, to receive and buffer redirected traffic for the UE from the source eNodeB, to detect connection of the UE and to send the buffered traffic to the UE,
wherein the target eNodeB implements a distributed serving gateway and a target tunnel router facilitates communication, the handover manager to send an endpoint identifier (EID) routing locator update to a location identifier separation protocol (LISP) mapping server (MS) to notify the LISP MS that the EID of the UE is now associated with that target TR.

14. The network device of claim 13, wherein the handover manager to send an acknowledgement of the handover message to the source eNodeB.

15. The network device of claim 13, wherein the handover manager to notify correspondent devices of the UE location.

16. The network device of claim 15, wherein the handover manager to receive traffic for the UE from remote tunnel routers.

* * * * *

UNITED STATES PATENT AND TRADEMARK OFFICE
CERTIFICATE OF CORRECTION

PATENT NO. : 10,716,045 B2
APPLICATION NO. : 16/480299
DATED : July 14, 2020
INVENTOR(S) : David Ian Allan and Joel Halpern Page 1 of 1

It is certified that error appears in the above-identified patent and that said Letters Patent is hereby corrected as shown below:

On the Title Page

"(72) Inventors: David Ian ALLAN, San Jose, CA (US); Joel HALPERN, Lessburg, VA (US)"
Should read:
-- (72) Inventors: David Ian ALLAN, San Jose, CA (US); Joel HALPERN, Leesburg, VA (US) --

Signed and Sealed this
Twentieth Day of October, 2020

Andrei Iancu
*Director of the United States Patent and Trademark Office*